United States Patent
Haynes et al.

(10) Patent No.: US 10,579,063 B2
(45) Date of Patent: Mar. 3, 2020

(54) MACHINE LEARNING FOR PREDICTING LOCATIONS OF OBJECTS PERCEIVED BY AUTONOMOUS VEHICLES

(71) Applicant: UATC, LLC, San Francisco, CA (US)

(72) Inventors: Galen Clark Haynes, Pittsburgh, PA (US); Ian Dewancker, Pittsburgh, PA (US); Nemanja Djuric, Pittsburgh, PA (US); Tzu-Kuo Huang, Pittsburgh, PA (US); Tian Lan, Pittsburgh, PA (US); Tsung-Han Lin, Pittsburgh, PA (US); Micol Marchetti-Bowick, Pittsburgh, PA (US); Vladan Radosavljevic, Pittsburgh, PA (US); Jeff Schneider, Pittsburgh, PA (US); Alexander David Styler, Pittsburgh, PA (US); Neil Traft, Pittsburgh, PA (US); Huahua Wang, Pittsburgh, PA (US); Anthony Joseph Stentz, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 15/684,865

(22) Filed: Aug. 23, 2017

(65) Prior Publication Data
US 2019/0025841 A1    Jan. 24, 2019

Related U.S. Application Data

(60) Provisional application No. 62/535,343, filed on Jul. 21, 2017.

(51) Int. Cl.
*G01C 21/20*    (2006.01)
*G08G 1/16*    (2006.01)
(Continued)

(52) U.S. Cl.
CPC .......... *G05D 1/0221* (2013.01); *B60W 30/00* (2013.01); *G01C 21/20* (2013.01);
(Continued)

(58) Field of Classification Search
CPC ............................. G05D 1/0274; G01C 21/20
See application file for complete search history.

(56) References Cited

U.S. PATENT DOCUMENTS

| 9,914,452 B1 | 3/2018 | Ferguson et al. |
| 2005/0127242 A1* | 6/2005 | Rivers, Jr. ............. B64C 39/024 244/137.1 |

(Continued)

*Primary Examiner* — Khoi H Tran
*Assistant Examiner* — Rodney P King
(74) *Attorney, Agent, or Firm* — Dority & Manning, P.A.

(57) ABSTRACT

The present disclosure provides systems and methods for predicting the future locations of objects that are perceived by autonomous vehicles. An autonomous vehicle can include a prediction system that, for each object perceived by the autonomous vehicle, generates one or more potential goals, selects one or more of the potential goals, and develops one or more trajectories by which the object can achieve the one or more selected goals. The prediction systems and methods described herein can include or leverage one or more machine-learned models that assist in predicting the future locations of the objects. As an example, in some implementations, the prediction system can include a machine-learned static object classifier, a machine-learned goal scoring model, a machine-learned trajectory development model, a machine-learned ballistic quality classifier, and/or other machine-learned models. The use of machine-learned models can improve the speed, quality, and/or accuracy of the generated predictions.

19 Claims, 7 Drawing Sheets

(51) Int. Cl.
*G05D 1/02* (2020.01)
*G01C 21/34* (2006.01)
*B60W 30/00* (2006.01)

(52) U.S. Cl.
CPC ....... *G01C 21/3492* (2013.01); *G05D 1/0214* (2013.01); *G05D 2201/0213* (2013.01); *G08G 1/165* (2013.01); *G08G 1/166* (2013.01)

(56) References Cited

U.S. PATENT DOCUMENTS

| | | | |
|---|---|---|---|
| 2011/0098056 A1* | 4/2011 | Rhoads | G01C 21/20 455/456.1 |
| 2012/0083960 A1* | 4/2012 | Zhu | G05D 1/0214 701/23 |
| 2014/0114885 A1* | 4/2014 | Han | G06N 3/0454 706/12 |
| 2014/0297172 A1* | 10/2014 | Huelsen | G01S 13/931 701/301 |
| 2014/0309836 A1* | 10/2014 | Ollis | G08G 1/22 701/25 |
| 2015/0179062 A1 | 6/2015 | Ralston et al. | |
| 2017/0221110 A1 | 8/2017 | Sullivan et al. | |
| 2017/0313323 A1* | 11/2017 | Tseng | B60K 35/00 |
| 2018/0033310 A1 | 2/2018 | Kentley-Klay et al. | |

\* cited by examiner

MACHINE LEARNING FOR PREDICTING LOCATIONS OF OBJECTS PERCEIVED BY AUTONOMOUS VEHICLES

FIELD

The present disclosure relates generally to autonomous vehicle technology. More particularly, the present disclosure relates to machine learning for predicting locations of objects perceived by autonomous vehicles.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

Thus, a key objective associated with an autonomous vehicle is the ability to perceive the location of objects that are proximate to the autonomous vehicle and, further, to predict or otherwise understand where such object will be in the near future (e.g., the next one to ten seconds). The ability to accurately and precisely predict the future locations of objects is central to enabling the autonomous vehicle to generate an appropriate motion plan through its surrounding environment.

SUMMARY

Aspects and advantages of embodiments of the present disclosure will be set forth in part in the following description, or can be learned from the description, or can be learned through practice of the embodiments.

One aspect of the present disclosure is directed to a computer system. The computer system includes one or more processors. The computer system includes a scenario generation system implemented by the one or more processors. The scenario generation system is configured to: receive state data descriptive of at least a current or past state of an object that is perceived by an autonomous vehicle; and generate one or more goals for the object based at least in part on the state data. The computer system includes a scenario development system implemented by the one or more processors. The scenario development system is configured to: receive data indicative of at least one of the one or more goals generated by the scenario generation system; and determine at least one predicted trajectory by which the object achieves the at least one of the one or more goals.

Another aspect of the present disclosure is directed to an autonomous vehicle. The autonomous vehicle includes one or more processors and one or more non-transitory computer-readable media that collectively store instructions that, when executed by the one or more processors, cause the one or more processors to perform operations. The operations include obtaining state data descriptive of at least one current or past state of an object that is perceived by an autonomous vehicle. The operations include generating one or more goals for the object based at least in part on the state data. The operations include selecting at least a first goal of the one or more goals generated for the object. The operations include determining at least a first predicted trajectory by which the object achieves the first goal.

Another aspect of the present disclosure is directed to a computer-implemented method. The method includes obtaining, by a computing system comprising one or more computing devices, state data descriptive of at least one current or past state of an object that is perceived by an autonomous vehicle. The method includes generating, by the computing system, one or more goals for the object based at least in part on the state data. The method includes selecting, by the computing system, at least a first goal of the one or more goals generated for the object. The method includes determining, by the computing system, at least a first predicted trajectory by which the object achieves the first goal.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
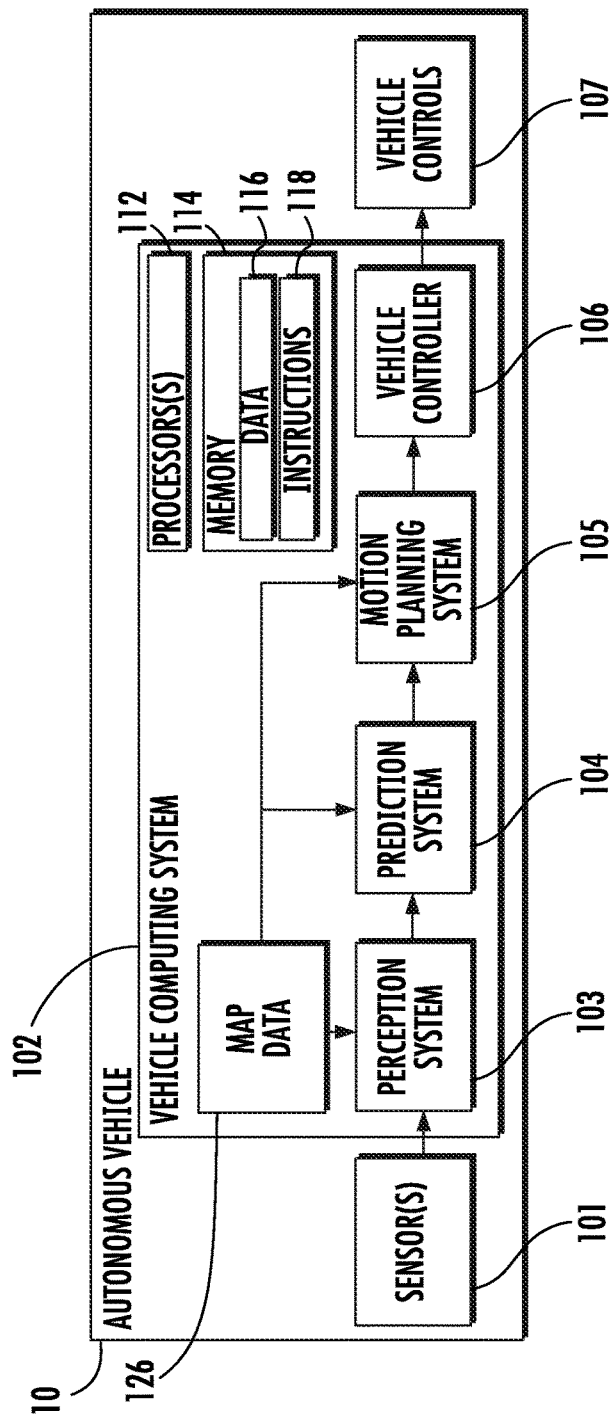
FIG. 1 depicts a block diagram of an example autonomous vehicle according to example embodiments of the present disclosure.

Generally, the present disclosure is directed to systems and methods for predicting the future locations of objects that are perceived by autonomous vehicles. In particular, an autonomous vehicle can include or otherwise use a prediction system to predict the future locations of the objects based at least in part on perception information that describes current and/or past states of the objects and/or the surrounding environment. In some implementations, the prediction system can be a goal-oriented prediction system that, for each object perceived by the autonomous vehicle, generates one or more potential goals, selects one or more of the potential goals, and develops one or more trajectories by which the object can achieve the one or more selected goals. For example, the prediction system can include a scenario generation system that generates and/or scores the one or more goals for each object and a scenario development system that determines one or more trajectories by which the object can achieve the goal(s). According to another aspect of the present disclosure, the prediction systems and methods described herein can include or leverage one or more machine-learned models that assist in predicting the future locations of the objects. As an example, in some implementations, the prediction system can include a machine-learned static object classifier, a machine-learned goal scoring model, a machine-learned trajectory development model, a machine-learned ballistic quality classifier, and/or other machine-learned models. The use of machine-learned models can improve the speed, quality, and/or accuracy of the generated predictions. The improved ability to predict future object location(s) can enable improved motion planning or other control of the autonomous vehicle based on such predicted future object locations, thereby enhancing passenger safety and vehicle efficiency.

More particularly, in some implementations, an autonomous vehicle can include a computing system that assists in controlling the autonomous vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the computing system can include a perception system, a prediction system, and a motion planning system that cooperate to perceive the surrounding environment of the autonomous vehicle and determine a motion plan for controlling the motion of the autonomous vehicle accordingly.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the computing system in comprehending and perceiving its surrounding environment and its relationship thereto.

In addition, according to an aspect of the present disclosure, the map data can include information that describes a significant number of nominal pathways through the world. As an example, in some instances, nominal pathways can generally correspond to common patterns of vehicle travel along one or more lanes (e.g., lanes on a roadway or other travelway). As one example, a nominal pathway can generally describe a path by which a vehicle or other object may: continue according to its current lane; merge from its current lane into an adjacent lane; turn from the current lane into an adjacent road portion; or other pathways that correspond to other driving actions. Thus, in many instances, a nominal pathway may closely correspond to the lane information that describes the location and direction of various traffic lanes. Traffic lanes can be defined and/or marked areas or volumes for travel along a travelway such as a roadway or airspace. In some implementations, the nominal pathways can be predefined and stored in a memory of the autonomous vehicle and then accessed and used according to the present disclosure.

In some implementations, the nominal pathway data may have originally been designed or otherwise identified as pathways to which the motion of the autonomous vehicle is restrained. As such, the autonomous vehicle can use the nominal pathway data in planning its own path or other motion. In such implementations, the nominal pathway data can also be used for object location prediction purposes of the present disclosure. However, in other implementations, the nominal pathway data can have been generated based on a plurality of historical observations of vehicles or other objects over a period of time. For example, as autonomous vehicles observe, detect, and track objects (e.g., other humanly-operated vehicles) in their environment over time, a significant amount of data can be collected that describes the behavior of such vehicles at various particular locations over time. By analyzing such collected data to identify the most common paths of travel at each location (e.g., at each roadway or road segment), nominal pathways can be generated for each location that correspond to or otherwise mimic such common paths of travel. Thus, in some implementations, the nominal pathways can correspond to paths that were most commonly taken by humanly-operated vehicles observed at various locations over a period of time and, therefore, can more accurately reflect actual humanly-operated vehicle behavior, as opposed to nominal pathways that adhere strictly to lane or other roadway shapes. For example, a nominal pathway identified in such way can include a small bump or lurch away from a lane center that corresponds to a location where drivers commonly nudge outwards to avoid a large pothole. In some implementations, the nominal pathways can be obtained from a combination of various different data sources.

In some implementations, different nominal pathways can be associated with or otherwise provided for different classes of objects. For example, object classes can include a vehicle class, a pedestrian class, a bicycle class, a public transportation class (e.g., bus or light rail), or other object classes. Different nominal pathways can be provided for each object class. For example, nominal pathways for the vehicle class may correspond to common pathways of vehicle travel while nominal pathways for the bicycle class correspond to pathways of bicycle travel (e.g., along a bike path or bike lane) and nominal pathways for the pedestrian class correspond to pathways of pedestrian travel (e.g., along a crosswalk). The object classes described above are provided as examples only, many different object classes can be used, including, for example, subclasses of the above described classes. For example, a vehicle class can include a semi-trailer truck class, a sedan class, an autonomous vehicle class for other autonomous vehicles, etc. As another example, a pedestrian class can include a fast-moving (e.g., runner) pedestrian class and a slow-moving (e.g., walker) pedestrian class. Different nominal pathways can be defined for each of such classes (e.g., a semi-trailer truck approaches and executes a turn differently than a sedan does).

Referring again to the computing system of the autonomous vehicle, based on sensor data received from the one or more sensors and/or the map data, the perception system can identify one or more objects that are proximate to the autonomous vehicle. As an example, in some implementations, the perception system can segment the sensor data (e.g., the LIDAR data) into discrete object polygons and/or track objects frame-to-frame (e.g., iteratively over a number of time periods).

In particular, in some implementations, the perception system can provide, for each object, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon or other shape); class (e.g., vehicle vs. pedestrian vs. bicycle); and/or other state information and/or covariances of the above-described forms of state information. The perception system can provide the state data to the prediction system (e.g., iteratively at each time period).

The prediction system can predict the future locations of the objects based at least in part on perception information (e.g., the state data for each object) received from the perception system, the map data, the sensor data, and/or any other data that describes the past and/or current state of the objects, the autonomous vehicle, the surrounding environment, and/or relationship(s) therebetween. For example, the prediction system can estimate the future motion of actors or other objects over a planning horizon which corresponds to the period of time (e.g., 10 seconds) for which a motion plan for the autonomous vehicle is generated. In some implementations, the prediction system can attach probability likelihoods to each predicted motion or other future location of the objects.

According to an aspect of the present disclosure, in some implementations, the prediction system can be a goal-oriented prediction system that, for each object perceived by the autonomous vehicle, generates one or more potential goals, selects one or more of the most likely potential goals, and develops one or more trajectories by which the object can achieve the one or more selected goals. For example, the prediction system can include a scenario generation system that generates and/or scores the one or more goals for each object and a scenario development system that determines the one or more trajectories by which the object can achieve the goals.

Thus, the scenario generation system can describe where each actor or other object in a scene is attempting to go. More particularly, the scenario generation system can generate, for each object, one or more goals, where each goal corresponds to a set of decisions that the object must make to get somewhere or otherwise achieve a desired location. As examples, a goal can correspond to turning left versus turning right versus stopping at a stop sign. As another example, different goals can correspond to yielding or not yielding to another vehicle or other object (e.g., the autonomous vehicle).

As such, in some implementations, the outputs of the scenario generation system can be goals which have associated goal locations to be achieved by an object. In some implementations, the goal locations can take the form of lists of lanes that the object is following. For example, in some implementations, to be following a lane, an object must be well overlapped (e.g., to some threshold amount) with a lane polygon associated with the lane, be well aligned (e.g., to some threshold amount) with a lane heading associated with the lane, not be violating the autonomous vehicle's right of way, and/or satisfy other rules. In addition, in some implementations, many outputs (e.g., goals) for a single object are possible.

In some implementations, the scenario generation system can score, rank, and/or cull generated goals for each object. For example, a subset of all generated goals can be selected based on the scores, ranking, etc. The scenario generation system can pass one or more of the goals (e.g., the selected subset of goals) to the scenario development system.

The scenario development system can accurately predict one or more trajectories (e.g., exact trajectories) of motion along which each object will travel to achieve its corresponding goal(s). Thus, while in some implementations the scenario generation system can be spatial in nature, the scenario development system can be spatiotemporal in nature.

According to another aspect of the present disclosure, the prediction systems and methods described herein can include or leverage one or more machine-learned models that assist in predicting the future locations of the objects. As an example, in some implementations, the prediction system can include a machine-learned static object classifier, a machine-learned goal scoring model, a machine-learned trajectory development model, and/or other machine-learned models.

According to yet another aspect of the present disclosure, some or all of the machine-learned models included in or employed by the prediction systems described herein can be trained using log data collected during actual operation of autonomous vehicles on travelways (e.g., roadways). For example, the log data can include sensor data and/or state data for various objects observed by an autonomous vehicle (e.g., the perception system of an autonomous vehicle) and also the resulting trajectories or other motion data for each object that occurred subsequent and/or contemporaneous to collection of the sensor data and/or generation of the state data. Thus, the log data can include a large number of real-world examples of object trajectories or motion paired with the data collected and/or generated by the autonomous vehicle (e.g., sensor data, map data, perception data, etc.) contemporaneous to such motion. Training the machine-learned models on such real-world log data can enable the machine-learned models to predict object goals and/or trajectories which better mirror or mimic real-world object behavior and/or score object goals and/or trajectories based on their similarity to or approximation of real-world object behavior.

As indicated above, in some implementations, the prediction system can include a static object classifier. For example, the static object classifier can be included in the scenario generation system. The static object classifier can identify static objects that are unlikely to move in the near future. Example static objects include parked cars, delivery trucks, etc. Thus, the static object classifier can determine an intention of each vehicle or other object.

In some implementations, the static object classifier can be a machine-learned static object classifier that is configured to receive sensor data, map data, and/or perception information for each object and, in response, classify each object as either static or not static. In particular, the static object classifier can receive such data and information in the form of features for each object.

Features can be derived from the object and its relation to the road/environment and/or other objects. Example features include a recent and/or current state of the object such as information descriptive of an observed position, observed heading, and/or observed velocity (e.g., state data). Additional example features can be descriptive of the object's relationship to its surrounding environment (e.g., the road) such as the object's distance to a road edge, whether and to what extent the object is positioned in an area designated for parking, whether and to what extent the object is positioned in a lane designated for driving, the object's distance to an intersection, etc. Additional example features include attributes of the object such as, in the case of a vehicle for example, whether the headlights are illuminated, whether one or more turn signals are illuminated, whether the hazard lights are operating, etc. Yet additional example features can be descriptive of an interaction of other objects with the particular object being assessed. For example, if features indicate that other vehicles continue maneuvering around or otherwise passing a particular vehicle being assessed, such features might be indicative that the particular vehicle is static (e.g., a double-parked delivery truck). Thus, in some implementations, certain features can be computed and/or extracted from sensor data, map data, and/or perception information such as, for example, state data. The above features are provided as examples only; many other different and additional features can be used as well including any feature descriptive of the object and/or its relationship to the surrounding environment. In some implementations, feature information can be stored in or otherwise provided by a feature cache, which will be discussed in further detail below.

The static object classifier can be or include many different forms of machine-learned models. For example, in some implementations, the static object classifier can be or include a decision tree-based model. For example, the static object classifier can be a random forest model such as, for example, a boosted random forest classifier. As another example, the static object classifier can be or include a neural network (e.g., a deep neural network). Example neural networks include feed-forward neural networks, recurrent neural networks, convolutional neural networks, etc.

In some implementations, the static object classifier can provide, for each of a number of time periods, a numerical score (e.g., between 0 and 1) for each object that indicates a confidence that the object is static. In some of such implementations, some post-model filtering such as, for example, a low pass filter can be applied to the numerical scores or other output provided by the static object classifier over the time periods to reduce noise and improve consistency.

In some implementations, if an object is classified as or otherwise adjudged to be static, then the object can be assigned or otherwise attributed a goal of remaining stationary. In such instance, the corresponding trajectory can be null or otherwise indicative of remaining stationary. However, in some implementations, if an object is classified as or otherwise adjudged to be not static, then additional goals which correspond to at least some motion of the object can be generated, scored, ranked, and/or culled by the scenario generation system.

Generally, scenario goal generation can be performed according to any number of different strategies including, for example, multi-class classification (e.g., left turn versus right turn versus continuing straight), two-dimensional probability density, regression on two-dimensional goal points, and/or other techniques.

One particular example technique that can be performed by the scenario generation system to generate and/or score goals is binary classification on goals. In binary classification on goals, any number of different systems can be used to generate goals for an object. Each goal is then classified and/or scored for the object.

In some implementations, scenario goal generation can include lane association, lane rollout, rule-based culling, and/or nominal pathway rendering. For example, lane association can include identifying a current lane in which the object is currently following/located; lane rollout can include rolling out the current lane into one or more successors, thereby generating one or more lane sequences; and nominal pathway rendering can include transforming the one or more lane sequences into nominal pathways. As another example, in some implementations, in addition or alternatively to identify the current lane in which the object is currently located, lane association can include shifting an object according to its ballistic trajectory to identify additional lanes in which the object will be located in the near future. In such implementations, lane rollout can include rolling out such near future lanes identified based on the object's ballistic trajectory. As an example, through this ballistic trajectory approach, lane changes can be identified earlier. In yet other implementations, lane association can include identifying any nearby lanes that are within some threshold distance from the object.

Thus, in some implementations, goal generation can include identifying and/or providing a set of possible lane paths (e.g., a combination of one or more lanes) which may, in some instances, correspond to a nominal pathway. In particular, as described above, nominal pathways can generally correspond to common patterns of vehicle travel along one or more lanes (e.g., lanes on a roadway or other travelway). Thus, in some implementations, a goal selected for an object can be a lane-based nominal path goal when the machine-learned static object classifier classifies the object as not static.

In addition, as described above, different lanes, lane paths, and/or nominal pathways can be provided for different object types and, in some implementations, the goals generated for an object can be limited to the lanes and/or nominal pathways associated with the object's class. In other implementations, all lane paths and/or nominal pathways can be available for use as goals for every object, but the score provided for the pair of goal and object can account for the type of object as compared to the type of nominal pathway/lane (e.g., bus lane versus bike lane versus standard vehicle travel lane).

Thus, in some implementations, goal generation can include identifying a significant number of potential sets of lane paths and/or nominal pathways along which the object may have a goal of traveling. For example, lanes and/or nominal pathways can be identified based on a current position and/or heading of the object in addition to various other types of information and/or features (e.g., all lanes and/or nominal pathways within a threshold distance from the object can be identified as potential goals).

According to an aspect of the present disclosure, the prediction system (e.g., the scenario generation system of the prediction system) can include a goal scoring model that is trained or otherwise configured to provide a score for each pair of goal and object. Thus, given a pair of object and goal, the goal scoring model (e.g., a machine-learned goal scoring model) can determine and provide an indication (e.g., a score) of whether such goal is reasonable to assign or otherwise attribute to such object (e.g., is the goal actually where the object is likely to want or try to travel).

The goal scoring model can be or include many different forms of machine-learned models. For example, in some implementations, the goal scoring model can be or include a decision tree-based model. For example, the goal scoring model can be a random forest model such as, for example, a boosted random forest classifier. As another example, the goal scoring model can be or include a neural network (e.g., a deep neural network). Example neural networks include feed-forward neural networks, recurrent neural networks, convolutional neural networks, etc.

In some implementations, for each pair of object and goal, the goal scoring model can receive features descriptive of the object, the goal, and/or a relationship between the object and the goal. For example, any of the example features described above can be used by the goal scoring model. In addition, in some implementations in which goals include lanes, lane paths, and/or nominal pathways, the features provided to the goal scoring model can include features descriptive of the object's relationship to the lane, lane paths, and/or nominal pathway. As examples, such features can include current, past, and/or future path-relative or lane-relative states such as relative position to the lane or path, relative velocity, relative acceleration, and relative heading; path or lane properties such as path/lane curvature, path/lane average speed limit, path/lane average advised speed; relationships of the object to the lane/road boundaries such as distance to a left edge, distance to a right edge, and an object lane overlap amount (e.g., lane overlap ratio); relationships of the object to intersections such as a current turn direction, a next turn direction, a distance to the next lane, a distance to the next intersection; a relationship of the object to the autonomous vehicle; and/or extrapolated future states. The goal scoring model can provide a score for the pair of object and goal based at least in part on such features.

In some implementations, a subset of all generated goals can be selected based on the scores provided for the goals by the goal scoring model. In one example, all goals that received a score higher than a threshold value can be included in the selected subset. As another example, the goals can be ranked on the basis of their scores, and a predetermined number of the highest ranked goals can be selected. The selected subset of goals can be provided to the scenario development system.

In particular, in some implementations, so long as at least one goal was found to be satisfactory (e.g., included in the selected subset), the selected subset of goals can be provided to a trajectory development model. However, in some implementations, if no goals were found to be satisfactory (e.g., none of the goals received a score greater than a threshold value), then a ballistics motion model can be employed rather than or in addition to the trajectory development model.

The trajectory development model can generate one or more predicted trajectories respectively for the one or more goals. In particular, the predicted trajectory for each goal (e.g., each goal included in the selected subset) can describe a trajectory by which the object achieves such goal (e.g., completes a left turn). Thus, the trajectory development model can simulate the motion of the objects to achieve their assigned goal(s).

In some implementations, the trajectory development model can be a learning-based predictor. In particular, in some implementations, the trajectory development model can be trained using real-world log data that is descriptive of real-world trajectories taken by objects (e.g., humanly-operated vehicles). As such, the predictions provided by the trajectory development model can more closely resemble (and therefore more accurately predict) the trajectories taken by the object(s).

In some implementations, the prediction system can include a number of different trajectory development models that respectively correspond to and predict trajectories for a number of different object classes. Thus, a pedestrian trajectory development model can be trained on pedestrian-specific data to predict trajectories for objects classified as pedestrians while a bicycle trajectory development model can be trained on bicycle-specific data to predict trajectories for objects classified as bicycles, etc. However, in other implementations, a single trajectory development model predicts trajectories for all classes and, for example, the class of the object can be provided as an input feature to the model.

The trajectory development model can be or include many different forms of machine-learned models. For example, in some implementations, the trajectory development model can be or include a decision tree-based model. For example, the trajectory development model can be a random forest model such as, for example, a boosted regression forest. As another example, the trajectory development model can be or include a neural network (e.g., a deep neural network). Example neural networks include feed-forward neural networks, recurrent neural networks, convolutional neural networks, etc.

In some implementations, each predicted trajectory provided by the trajectory development model can include a sequence of future states (e.g., positions, velocities, etc.) for the object. Thus, the predicted trajectory can include a sequence of predicted future object state data over a number of time periods.

In some implementations, the trajectory development model can provide each predicted trajectory in coordinates defined relative to a lane, lane path, and/or nominal pathway, where the corresponding goal includes continued travel of the object along the lane, lane path, and/or nominal pathway.

In one particular example of the above described concepts, in some implementations, the trajectory development model can be or include a machine-learned random regression forest. The machine-learned random regression forest can include a plurality of decision trees that each output a plurality of sequences of future states for the object. In particular, each decision tree can output at one of its leaves the full trajectory predicted by such decision tree.

In addition, in some implementations, a weighted sum of the plurality of sequences respectively provided by the plurality of decision trees can be formed based on a plurality of weights respectively assigned to the plurality of decision trees. Such weighted sum can be used as the predicted trajectory provided by the trajectory development model for the corresponding goal.

Thus, the trajectory development model can provide a trajectory by which the object can achieve a particular goal. However, as indicated above, in instances in which no satisfactory goal was identified, a ballistics motion model can be employed rather than or in addition to the trajectory development model.

In addition, in some implementations, the scenario development system can further include a trajectory scoring model that generates a score for each predicted trajectory provided by the trajectory development model. For example, the trajectory scoring model can be a machine-learned model trained or otherwise configured to receive a trajectory and provide a score indicative of, for example, how realistic or achievable such trajectory is for the object. For example, the trajectory scoring model can be trained on training data that includes trajectories labelled as a valid trajectory (e.g., an observed trajectory) or an invalid trajectory (e.g., a synthesized trajectory).

Similarly to the goal scoring process, the score generated by the trajectory scoring model for each predicted trajectory can be compared to a threshold score. In some implementations if none of the trajectories receive a score greater than the threshold score, then the ballistics motion model can be employed rather than or in addition to use of the predicted trajectories provided by the trajectory development model.

The ballistics motion model can be used to provide a predicted trajectory for an object that is not static but for which the system was unable to determine a satisfactory goal (e.g., the object does not appear to be following standard goal-based behavior) and/or unable to determine a satisfactory predicted trajectory. In some instances, use of the ballistics motion model can be viewed as trajectory prediction without an explicit goal. As such, the ballistics motion model can assist in addressing some map issues, off-map actors, and/or unconventional behavior.

In some implementations, the ballistics motion model can roll out the current state (e.g., position, heading, speed) of the object to provide a predicted trajectory. For example, in some implementations, the perception system described above can employ a Kalman filter to model object (e.g., vehicle) motion dynamics. As such, in some implementations, the ballistics motion model can perform a forward integration of this Kalman filter model to generate the predicted trajectory based on the current and/or past state of the object.

In some implementations, the predicted trajectory provided by the ballistics motion model can be used as the predicted trajectory for the object without further analysis. However, in other implementations, the scenario development system can further include a ballistic quality classifier. The ballistic quality classifier can distinguish good from poor ballistics-based trajectories. In some implementations, the ballistic quality classifier can simply provide a binary classification for the predicted trajectory provided by the ballistics motion model. In other implementations, the ballistic quality classifier can provide a score (e.g., a regression score) for the predicted trajectory, and, in some implementations, the score can be compared to a threshold value to determine a binary classification for the predicted trajectory.

In some implementations, the score provided by the ballistic quality classifier can impact a time period and/or probability assigned to or used in conjunction with the predicted trajectory. For example, a predicted trajectory that receives a lower score can be assigned a lower confidence value or probability and/or modified so that only a portion of the predicted trajectory associated with a shorter period of time is used or otherwise passed to the motion planning system.

In some implementations, the ballistic quality classifier can be a machine-learned model, such as, for example, a decision-tree-based model and/or a neural network. For example, the ballistic quality classifier can be or include a machine-learned regression forest binary classifier. In some implementations, the ballistic quality classifier can be trained to have a high recall (e.g., to retrieve a large number of good ballistics, while allowing some bad ballistics in the system). In some implementations, the roll-out horizon of the predicted trajectory provided by the ballistics motion model can itself be predicted or otherwise adjustable.

In some implementations, if the predicted trajectory provided by the ballistics motion model is classified as unsatisfactory by the ballistic quality classifier, the corresponding object and/or goal can be treated as a default or fall-through case. In some implementations, in the default or fall-through case, the prediction system can simply assume the object will remain static. In other implementations, in the default or fall-through case, the motion plan can be modified or otherwise generated with an explicit objective to stay away from or otherwise avoid a general area in which the fall-through object is located.

In some implementations, a probability can be assigned to each predicted trajectory, whether generated by the trajectory development model or the ballistics motion model. For example, the probability assigned to a given trajectory can be based at least in part on the score provided for the corresponding goal by the goal scoring model. The probability assigned to each trajectory can be taken into account when performing motion planning.

Thus, the prediction systems of the present disclosure can include or leverage a number of machine-learned models that assist in predicting the future locations of the objects. The use of machine-learned models can improve the speed, quality, and/or accuracy of the generated predictions.

The improved ability to predict future object location(s) can enable improved motion planning or other control of the autonomous vehicle based on such predicted future object locations. In particular, in some implementations, the prediction system can provide the predicted trajector(ies) for each object to the motion planning system of the autonomous vehicle computing system.

The motion planning system can determine a motion plan for the autonomous vehicle based at least in part on the predicted trajector(ies) for each object. Stated differently, given predictions about the future locations of proximate objects, the motion planning system can determine a motion plan for the autonomous vehicle that best navigates the vehicle relative to the objects at their future locations.

As one example, in some implementations, the motion planning system can determine a cost function for each of one or more candidate motion plans for the autonomous vehicle based at least in part on the predicted future locations of the objects. For example, the cost function can describe a cost (e.g., over time) of adhering to a particular candidate motion plan. For example, the cost described by a cost function can increase when the autonomous vehicle strikes another object and/or deviates from a preferred pathway (e.g., a nominal pathway).

Thus, given information about the predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system can provide the selected motion plan to a vehicle controller that controls one or more vehicle controls (e.g., actuators that control gas flow, steering, braking, etc.) to execute the selected motion plan.

Thus, the present disclosure provides systems and methods for predicting the future locations of objects that are perceived by autonomous vehicles. In particular, by performing goal-oriented trajectory prediction and/or using machine-learned models, the systems and methods of the present disclosure can better predict one or more future locations of the object. The improved ability to predict future object location(s) can enable improved motion planning or other control of the autonomous vehicle based on such predicted future object locations, thereby further enhancing passenger safety and vehicle efficiency.

As such, one technical effect and benefit of the present disclosure is improved prediction of future object locations. In particular, the present disclosure provides techniques that enable a computing system to perform prediction of future object locations with levels of accuracy and precision that were heretofore unobtainable using existing computers. Thus, the present disclosure improves the operation of an autonomous vehicle computing system and the autonomous vehicle it controls. In addition, the present disclosure provides a particular solution to the problem of object location prediction and provides a particular way (e.g., goal-oriented trajectory prediction and/or use of machine-learned models) to achieve the desired outcome. The present disclosure also provides additional technical effects and benefits, including, for example, enhancing passenger safety and improving vehicle efficiency by reducing collisions.

With reference now to the Figures, example embodiments of the present disclosure will be discussed in further detail.

Example Devices and Systems

FIG. 1 depicts a block diagram of an example autonomous vehicle 10 according to example embodiments of the present disclosure. The autonomous vehicle 10 is capable of sensing its environment and navigating with little to no human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data 126 that provides information that assists the computing system in comprehending and perceiving its surrounding environment and its relationship thereto.

In addition, according to an aspect of the present disclosure, the map data 126 can include information that describes a significant number of nominal pathways through the world. As an example, in some instances, nominal pathways can generally correspond to common patterns of vehicle travel along one or more lanes (e.g., lanes on a roadway or other travelway). As one example, a nominal pathway can generally describe a path by which a vehicle or other object may: continue according to its current lane; merge from its current lane into an adjacent lane; turn from the current lane into an adjacent road portion; or other pathways that correspond to other driving actions. Thus, in many instances, a nominal pathway may closely correspond to the lane information that describes the location and direction of various traffic lanes. Traffic lanes can be defined and/or marked areas or volumes for travel along a travelway such as a roadway or airspace. In some implementations, the nominal pathways can be predefined and stored in a memory of the autonomous vehicle and then accessed and used according to the present disclosure.

In some implementations, the nominal pathway data may have originally been designed or otherwise identified as pathways to which the motion of the autonomous vehicle is restrained. As such, the autonomous vehicle can use the nominal pathway data in planning its own path or other motion. In such implementations, the nominal pathway data can also be used for object location prediction purposes of the present disclosure. However, in other implementations, the nominal pathway data can have been generated based on a plurality of historical observations of vehicles or other objects over a period of time. For example, as autonomous vehicles observe, detect, and track objects (e.g., other humanly-operated vehicles) in their environment over time, a significant amount of data can be collected that describes the behavior of such vehicles at various particular locations over time. By analyzing such collected data to identify the most common paths of travel at each location (e.g., at each roadway or road segment), nominal pathways can be generated for each location that correspond to or otherwise mimic such common paths of travel. Thus, in some implementations, the nominal pathways can correspond to paths that were most commonly taken by humanly-operated vehicles observed at various locations over a period of time and, therefore, can more accurately reflect actual humanly-operated vehicle behavior, as opposed to nominal pathways that adhere strictly to lane or other roadway shapes. For example, a nominal pathway identified in such way can include a small bump or lurch away from a lane center that corresponds to a location where drivers commonly nudge outwards to avoid a large pothole. In some implementations, the nominal pathways can be obtained from a combination of various different data sources.

In some implementations, different nominal pathways can be associated with or otherwise provided for different classes of objects. For example, object classes can include a vehicle class, a pedestrian class, a bicycle class, a public transportation class (e.g., bus or light rail), or other object classes. Different nominal pathways can be provided for each object class. For example, nominal pathways for the vehicle class may correspond to common pathways of vehicle travel while nominal pathways for the bicycle class correspond to pathways of bicycle travel (e.g., along a bike path or bike lane) and nominal pathways for the pedestrian class correspond to pathways of pedestrian travel (e.g., along a crosswalk). The object classes described above are provided as examples only, many different object classes can be used, including, for example, subclasses of the above described classes. For example, a vehicle class can include a semi-trailer truck class, a sedan class, an autonomous vehicle class for other autonomous vehicles, etc. As another example, a pedestrian class can include a fast-moving (e.g., runner) pedestrian class and a slow-moving (e.g., walker) pedestrian class. Different nominal pathways can be defined for each of such classes (e.g., a semi-trailer truck approaches and executes a turn differently than a sedan does).

Referring again to the vehicle computing system 102 of the autonomous vehicle 10, the perception system 103 can identify one or more objects that are proximate to the autonomous vehicle 10 based on sensor data received from the one or more sensors 101 and/or the map data 126. As an example, in some implementations, the perception system can segment the sensor data (e.g., the LIDAR data) into discrete object polygons and/or track objects frame-to-frame (e.g., iteratively over a number of time periods). In particular, in some implementations, the perception system 103 can provide, for each object, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon or other shape); class (e.g., vehicle vs. pedestrian vs. bicycle); and/or other state information and/or covariances of the above-described forms of state information. The perception system 103 can provide the state data to the prediction system 104 (e.g., iteratively at each time period).

The prediction system 104 can predict the future locations of the objects based at least in part on perception information (e.g., the state data for each object) received from the perception system 103, the map data 126, the sensor data, and/or any other data that describes the past and/or current state of the objects, the autonomous vehicle 10, the surrounding environment, and/or relationship(s) therebetween. For example, the prediction system 104 can estimate the future motion of actors or other objects over a planning horizon which corresponds to the period of time (e.g., 10 seconds) for which a motion plan for the autonomous vehicle 10 is generated. In some implementations, the prediction system 104 can attach probability likelihoods to each predicted motion or other future location of the objects.

The motion planning system 105 can determine a motion plan for the autonomous vehicle based at least in part on the predicted trajector(ies) for each object. Stated differently, given predictions about the future locations of proximate objects, the motion planning system 105 can determine a motion plan for the autonomous vehicle that best navigates the vehicle relative to the objects at their future locations.

As one example, in some implementations, the motion planning system 105 can determine a cost function for each of one or more candidate motion plans for the autonomous vehicle 10 based at least in part on the predicted future locations of the objects. For example, the cost function can describe a cost (e.g., over time) of adhering to a particular candidate motion plan. As simplified examples, the cost described by a cost function can increase when the autonomous vehicle 10 strikes another object and/or deviates from a preferred pathway (e.g., a nominal pathway).

Thus, given information about the predicted future locations of objects, the motion planning system 105 can determine a cost of adhering to a particular candidate pathway. The motion planning system 105 can select or determine a motion plan for the autonomous vehicle 10 based at least in part on the cost function(s). For example, the motion plan that minimizes the cost function can be selected or otherwise determined. The motion planning system 105 can provide the selected motion plan to a vehicle controller 106 that controls one or more vehicle controls 107 (e.g., actuators that control gas flow, steering, braking, etc.) to execute the selected motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
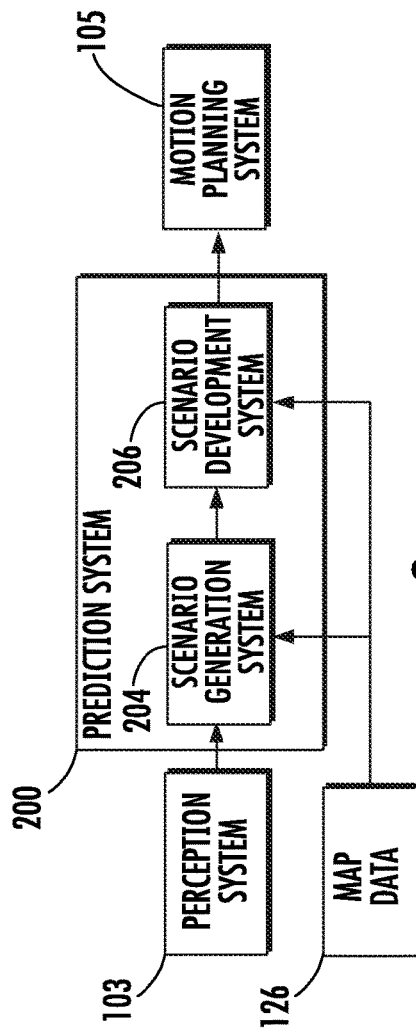
FIG. 2 depicts a block diagram of an example prediction system according to example embodiments of the present disclosure.

FIG. 2 depicts a block diagram of an example prediction system 200 according to example embodiments of the present disclosure. In particular, according to an aspect of the present disclosure, in some implementations, the prediction system 200 can be a goal-oriented prediction system that, for each object perceived by the autonomous vehicle, generates one or more potential goals, selects one or more of the most likely potential goals, and develops one or more trajectories by which the object can achieve the one or more selected goals. For example, the prediction system 200 can include a scenario generation system 204 that generates and/or scores the one or more goals for each object and a scenario development system 206 that determines the one or more trajectories by which the object can achieve the goals.

Thus, the scenario generation system 204 can describe where each actor or other object in a scene is attempting to go. More particularly, the scenario generation system 204 can generate, for each object, one or more goals, where each goal corresponds to a set of decisions that the object must make to get somewhere or otherwise achieve a desired location. As examples, a goal can correspond to turning left versus turning right versus stopping at a stop sign. As another example, different goals can correspond to yielding or not yielding to another vehicle or other object (e.g., the autonomous vehicle).

As such, in some implementations, the outputs of the scenario generation system 204 can be goals which have associated goal locations to be achieved by an object. In some implementations, the goal locations can take the form of lists of lanes that the object is following. In addition, in some implementations, many outputs (e.g., goals) for a single object are possible.

In some implementations, the scenario generation system 204 can score, rank, and/or cull generated goals for each object. For example, a subset of all generated goals can be selected based on the scores, ranking, etc. The scenario generation system 204 can pass one or more of the goals (e.g., the selected subset of goals) to the scenario development system 206.

The scenario development system 206 can accurately predict one or more trajectories (e.g., exact trajectories) of motion along which each object will travel to achieve its corresponding goal(s). Thus, while in some implementations the scenario generation system 204 can be spatial in nature, the scenario development system 206 can be spatiotemporal in nature.

Figure 3:
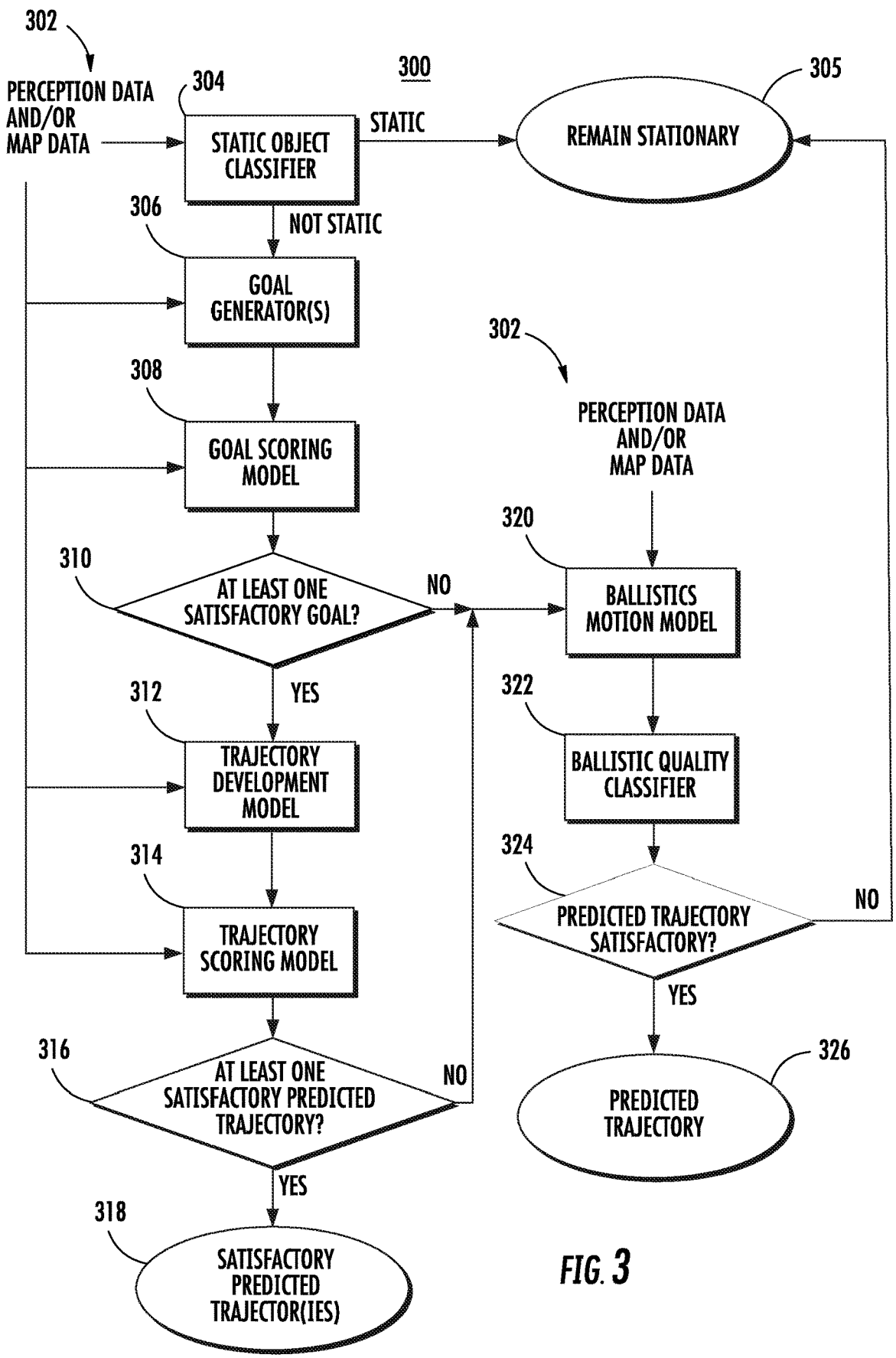
FIG. 3 depicts a workflow diagram of an example prediction system according to example embodiments of the present disclosure.

FIG. 3 depicts a workflow diagram of an example prediction system 300 according to example embodiments of the present disclosure. In particular, according to another aspect of the present disclosure, the prediction systems and methods described herein can include or leverage one or more machine-learned models that assist in predicting the future locations of the objects. As an example, in some implementations, the prediction system 300 can include a machine-learned static object classifier 304, a machine-learned goal scoring model 308, a machine-learned trajectory development model 312, a machine-learned ballistic quality classifier 322, and/or other machine-learned models.

According to yet another aspect of the present disclosure, some or all of the machine-learned models included in or employed by the prediction system 300 can be trained using log data collected during actual operation of autonomous vehicles on travelways (e.g., roadways). For example, the log data can include sensor data and/or state data for various objects observed by an autonomous vehicle (e.g., the perception system of an autonomous vehicle) and also the resulting trajectories, goals, or other motion data for each object that occurred subsequent and/or contemporaneous to collection of the sensor data and/or generation of the state data. Thus, the log data can include a large number of real-world examples of object trajectories, goals, or other motion paired with the data collected and/or generated by the autonomous vehicle (e.g., sensor data, map data, perception data, etc.) contemporaneous to such motion. Training the machine-learned models on such real-world log data can enable the machine-learned models to predict object goals and/or trajectories which better mirror or mimic real-world object behavior and/or score object goals and/or trajectories based on their similarity to or approximation of real-world object behavior.

Referring to the workflow diagram of FIG. 3, the prediction system 300 can include a static object classifier 304. For example, the static object classifier 304 can be included in the scenario generation system 204 of FIG. 2. The static object classifier 304 can identify static objects that are unlikely to move in the near future. Example static objects include parked cars, delivery trucks, etc. Thus, the static object classifier 304 can determine an intention of each vehicle or other object.

In some implementations, the static object classifier 304 can be a machine-learned static object classifier 304 that is configured to receive sensor data, map data, and/or perception information 302 for each object and, in response, classify each object as either static or not static. In particular, the static object classifier 304 can receive such data and information 302 in the form of features for each object.

The information 302 can include features derived from the object and/or its relation to the road/environment and/or other objects. Example features include a recent and/or current state of the object such as information descriptive of an observed position, observed heading, and/or observed velocity (e.g., state data). Additional example features can be descriptive of the object's relationship to its surrounding environment (e.g., the road) such as the object's distance to a road edge, whether and to what extent the object is positioned in an area designated for parking, whether and to what extent the object is positioned in a lane designated for driving, the object's distance to an intersection, etc. Additional example features include attributes of the object such as, in the case of a vehicle for example, whether the headlights are illuminated, whether one or more turn signals are illuminated, whether the hazard lights are operating, etc. Yet additional example features can be descriptive of an interaction of other objects with the particular object being assessed. For example, if features indicate that other vehicles continue maneuvering around or otherwise passing a particular vehicle being assessed, such features might be indicative that the particular vehicle is static (e.g., a double-parked delivery truck). Thus, in some implementations, certain features can be computed and/or extracted from sensor data, map data, and/or perception information 302 such as, for example, state data. The above features are provided as examples only; many other different and additional features can be used as well including any feature descriptive of the object and/or its relationship to the surrounding environment.

Figure 4:
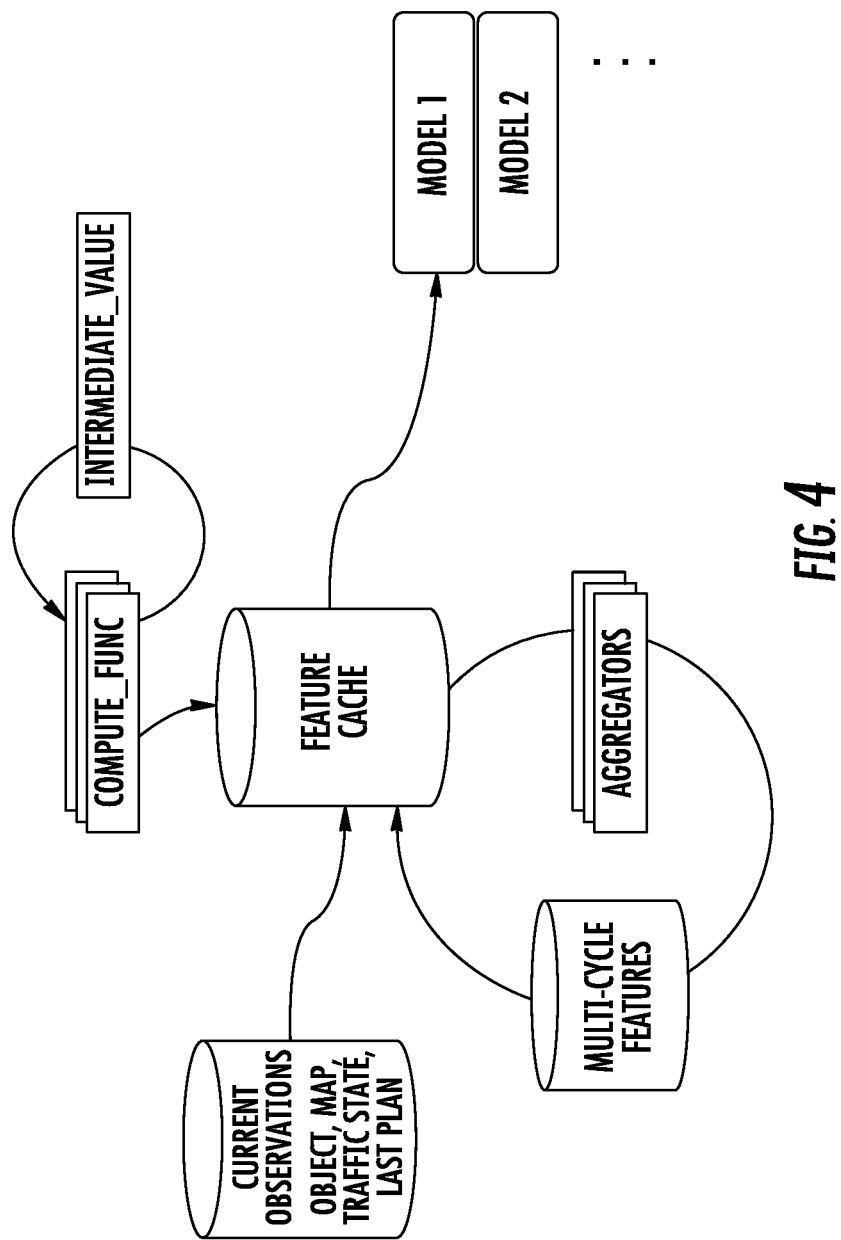
FIG. 4 depicts a block diagram of an example feature management system according to example embodiments of the present disclosure.

In some implementations, feature information can be stored in or otherwise provided by a feature cache. As an example, FIG. 4 depicts a block diagram of an example feature management system according to example embodiments of the present disclosure. The example feature management system of FIG. 4 includes a feature cache that stores features for actors and other environmental objects. The feature cache can provide features and/or other data to one or more models. For example, the feature cache can provide features in response to queries.

The feature cache can include or be implemented via one or more databases. The feature cache can receive updated features and/or other data in the form of current observations, which can then be processed and stored by the cache. An aggregation function can be performed to aggregate or update multi-cycle features. In some implementations, features can be computed from current and/or past observations (e.g., through performance of a compute function).

In some implementations, features can be stored, associated, and/or accessed (e.g., queried) on a per-object basis. Alternatively or additionally, features can be stored, associated, and/or accessed (e.g., queried) on the basis of object-goal pairs, object-nominal pathway pairs, object-autonomous vehicle pairs, object-object pairs, or other combinations of the object(s) and/or environmental information. To provide an example, a particular feature descriptive of a particular object's relative speed relative to an average speed associated with a particular nominal pathway can be stored, associated, and/or accessed (e.g., queried) on the basis of the combination of the particular object with the particular nominal pathway.

Referring again to FIG. 3, the static object classifier 304 can be or include many different forms of machine-learned models. For example, in some implementations, the static object classifier 304 can be or include a decision tree-based model. Example decision tree-based models include classification and/or regression trees; iterative dichotomiser 3 decision trees; C4.5 decision trees; chi-squared automatic interaction detection decision trees; decision stumps; conditional decision trees; etc.

In one particular example, the static object classifier 304 can be a random forest model such as, for example, a boosted random forest classifier. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Boosting is an example ensemble technique. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; MadaBoost, LogitBoost, gradient boosting; etc.

In another example, in some implementations, the static object classifier 304 can be or include a neural network (e.g., a deep neural network). Example neural networks include feed-forward neural networks, recurrent neural networks, convolutional neural networks, etc.

In some implementations, the static object classifier 304 can provide, for each of a number of time periods, a numerical score (e.g., between 0 and 1) for each object that indicates a confidence that the object is static. In some of such implementations, some post-model filtering such as, for example, a low pass filter can be applied to the numerical scores or other output provided by the static object classifier 304 over the time periods to reduce noise and improve consistency.

In some implementations, if an object is classified as or otherwise adjudged to be static, then the object can be assigned or otherwise attributed a goal of remaining stationary (e.g., as shown at 305). In such instance, the corresponding trajectory can be null or otherwise indicative of remaining stationary. However, in some implementations, if an object is classified as or otherwise adjudged to be not static, then additional goals which correspond to at least some motion of the object can be generated, scored, ranked, and/or culled by the scenario generation system.

Generally, scenario goal generation can be performed according to any number of different strategies including, for example, multi-class classification (e.g., left turn versus right turn versus continuing straight), two-dimensional probability density, regression on two-dimensional goal points, and/or other techniques.

One particular example technique that can be performed by the scenario generation system 204 to generate and/or score goals is binary classification on goals. In binary classification on goals, any number of different goal generators 306 can be used to generate goals for an object. Each goal is then classified and/or scored for the object.

In some implementations, scenario goal generation can include lane association, lane rollout, rule-based culling, and/or nominal pathway rendering. For example, in some implementations, one or more goal generators 306 can identify and/or provide a set of possible lane paths (e.g., a combination of one or more lanes or lane segments) which may, in some instances, correspond to a nominal pathway. In particular, as described above, nominal pathways can generally correspond to common patterns of vehicle travel along one or more lanes (e.g., lanes on a roadway or other travelway).

In addition, as described above, different lanes, lane paths, and/or nominal pathways can be provided for different object types and, in some implementations, the goals generated for an object can be limited to the lanes and/or nominal pathways associated with the object's class. In other implementations, all lane paths and/or nominal pathways can be available for use as goals for every object, but the score provided for the pair of goal and object can account for the type of object as compared to the type of nominal pathway/lane (e.g., bus lane versus bike lane versus standard vehicle travel lane).

Thus, in some implementations, one or more goal generators 306 can identify a significant number of potential sets of lane paths and/or nominal pathways along which the object may have a goal of traveling. For example, lanes and/or nominal pathways can be identified based on a current position and/or heading of the object in addition to various other types of information and/or features (e.g., all lanes and/or nominal pathways within a threshold distance from the object can be identified as potential goals).

According to an aspect of the present disclosure, the prediction system 300 can include a goal scoring model 308 that is trained or otherwise configured to provide a score for each pair of goal and object. Thus, given a pair of object and goal, the goal scoring model 308 (e.g., a machine-learned goal scoring model) can determine and provide an indication (e.g., a score) of whether such goal is reasonable to assign or otherwise attribute to such object (e.g., is the goal actually where the object is likely to want or try to travel).

The goal scoring model 308 can be or include many different forms of machine-learned models. For example, in some implementations, the goal scoring model 308 can be or include a decision tree-based model. For example, the goal scoring model 308 can be a random forest model such as, for example, a boosted random forest classifier. As another example, the goal scoring model 308 can be or include a neural network (e.g., a deep neural network). Example neural networks include feed-forward neural networks, recurrent neural networks, convolutional neural networks, etc.

In some implementations, for each pair of object and goal, the goal scoring model 308 can receive features descriptive of the object, the goal, and/or a relationship between the object and the goal. For example, any of the example features described above can be used by the goal scoring model 308. In addition, in some implementations in which goals include lanes, lane paths, and/or nominal pathways, the features provided to the goal scoring model 308 can include features descriptive of the object's relationship to the lane, lane paths, and/or nominal pathway. As examples, such features can include current path-relative states such as relative position to the lane or path, relative velocity, relative acceleration, and relative heading; path properties such as path curvature, path average speed limit, path average advised speed; relationships of the object to the lane/road boundaries such as distance to a left edge, distance to a right edge, and an object lane overlap amount (e.g., lane overlap ratio); relationships of the object to intersections such as a current turn direction, a next turn direction, a distance to the next lane, a distance to the next intersection; a relationship of the object to the autonomous vehicle; and/or extrapolated future states. The goal scoring model 308 can provide a score for the pair of object and goal based at least in part on such features.

In some implementations, the goal scoring model 308 can be trained based on labeled log data in which logged versions of the features described above are associated with a positive goal example that an observed object pursued in the log data (e.g., labeled as positive) and/or or more negative goal examples that the observed object did not pursue (e.g., labeled as negative).

In some implementations, a subset of all generated goals can be selected based on the scores provided for the goals by the goal scoring model 308. In one example, all goals that received a score higher than a threshold value can be included in the selected subset. As one example, the goal scoring model 308 can be binary classifier or, as another example, a regression model to which binary thresholding can be applied. As another example, the goals can be ranked on the basis of their scores, and a predetermined number of the highest ranked goals can be selected. The selected subset of goals can be provided to the scenario development system 206.

In particular, in some implementations, as long as at least one goal was found to be satisfactory (e.g., included in the selected subset), the selected subset of goals can be provided to a trajectory development model 312. However, in some implementations, if no goals were found to be satisfactory (e.g., none of the goals received a score greater than a threshold value), then a ballistics motion model 320 can be employed rather than or in addition to the trajectory development model 312. This decision or logic flow is illustrated at 310.

Figure 5:
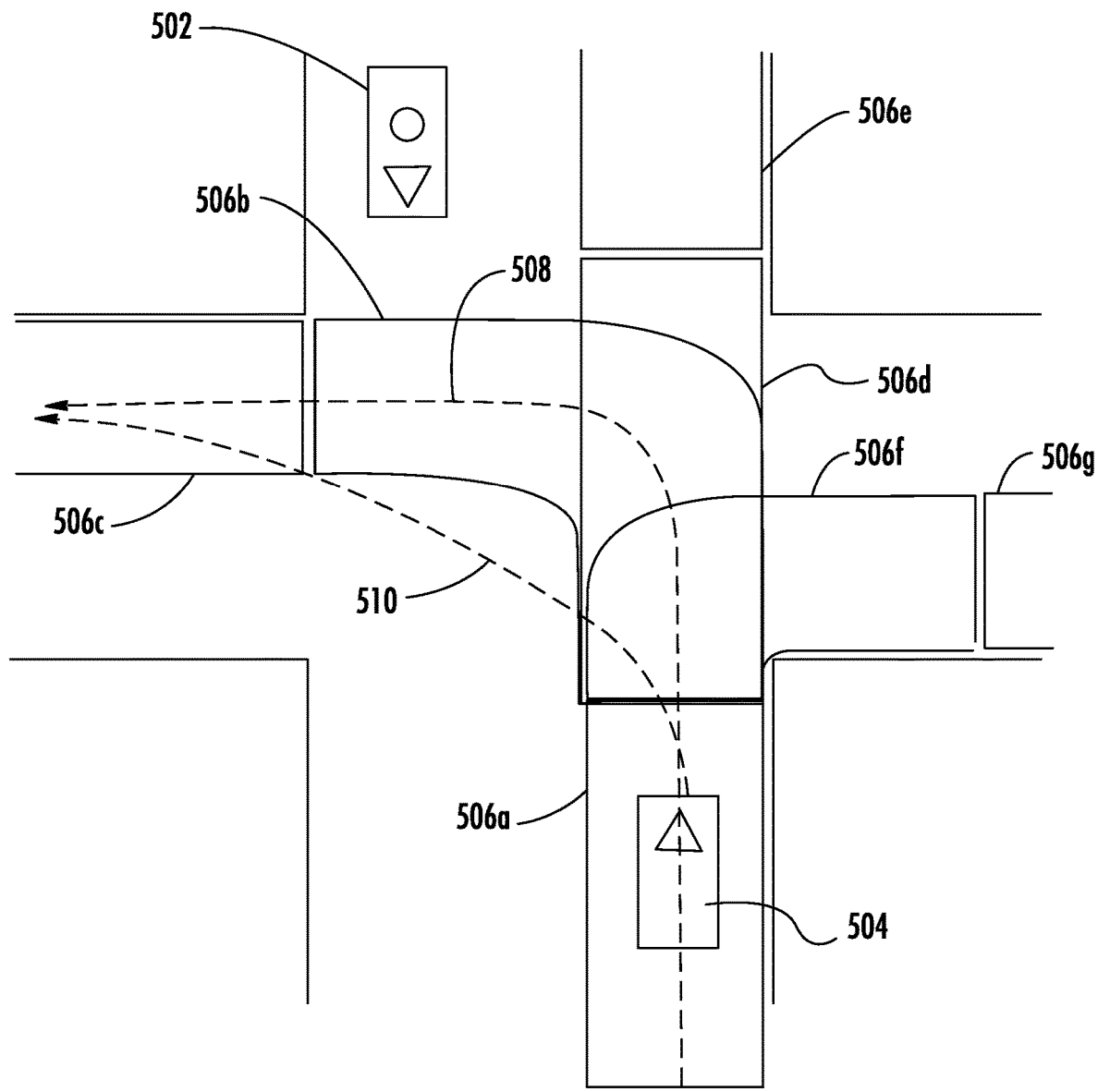
FIG. 5 depicts a graphical diagram of an example goal-based prediction process according to example embodiments of the present disclosure.

To provide one simplified example of the above-described aspects, FIG. 5 depicts a graphical diagram of an example goal-based prediction process according to example embodiments of the present disclosure. In particular, FIG. 5 depicts an autonomous vehicle 502 on a roadway. An additional vehicle 504 is also on the roadway and is perceived by the autonomous vehicle 502.

According to aspects of the present disclosure, the prediction system of the autonomous vehicle 502 can identify one or more goals for the perceived vehicle 504. As examples, identifying the goal(s) for the vehicle 504 can include identifying a number of different lanes (e.g., lane segments), lane paths, and/or nominal pathways.

In the depicted example, a set of lane segments 506a-g have been identified for the vehicle 504. For example, the lane segments 506a-g can be identified based on the location, heading, and/or other state data for the vehicle 504. In some implementations, one or more lane paths (e.g., a combination of particular segments) and/or nominal pathways can be identified based on the identified set of lane segments 506a-g. As one example, a nominal pathway 508 has been identified which corresponds to travel through a lane path that includes lane segments 506a, 506b, and 506c.

Thus, one example goal that can be identified for the vehicle 504 by the autonomous vehicle 502 is adherence to or completion of the nominal pathway 508; while another example goal may include adherence to or completion of the lane path that includes lane segments 506a, 506b, and 506c. Additional example goals might include adherence to or completion of a lane path that includes lane segments 506a, 506d, and 506e and/or adherence to or completion of a lane path that includes lane segments 506a, 506f, and 506g. Different nominal pathways can be associated with these lane paths as well. As will be discussed further below a predicted trajectory can be developed for one or more of the identified goal(s).

Figure 6A:
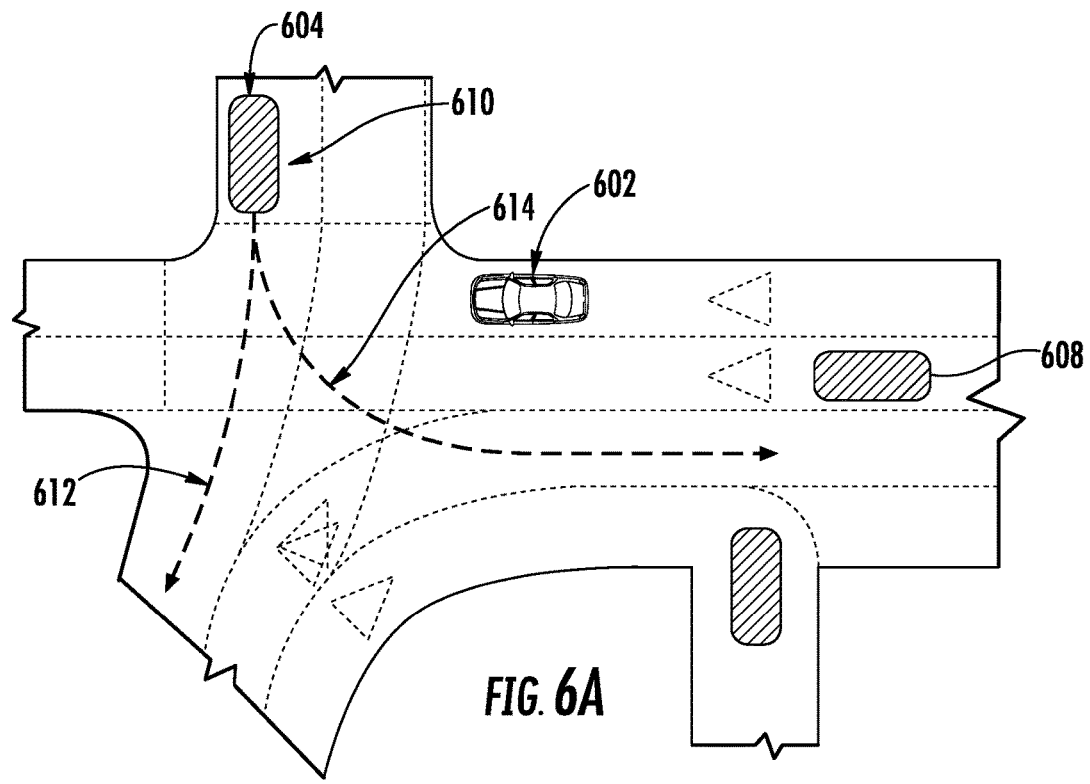
FIGS. 6A and 6B depict graphical diagrams of an example goal-based prediction process according to example embodiments of the present disclosure.
Figure 6B:
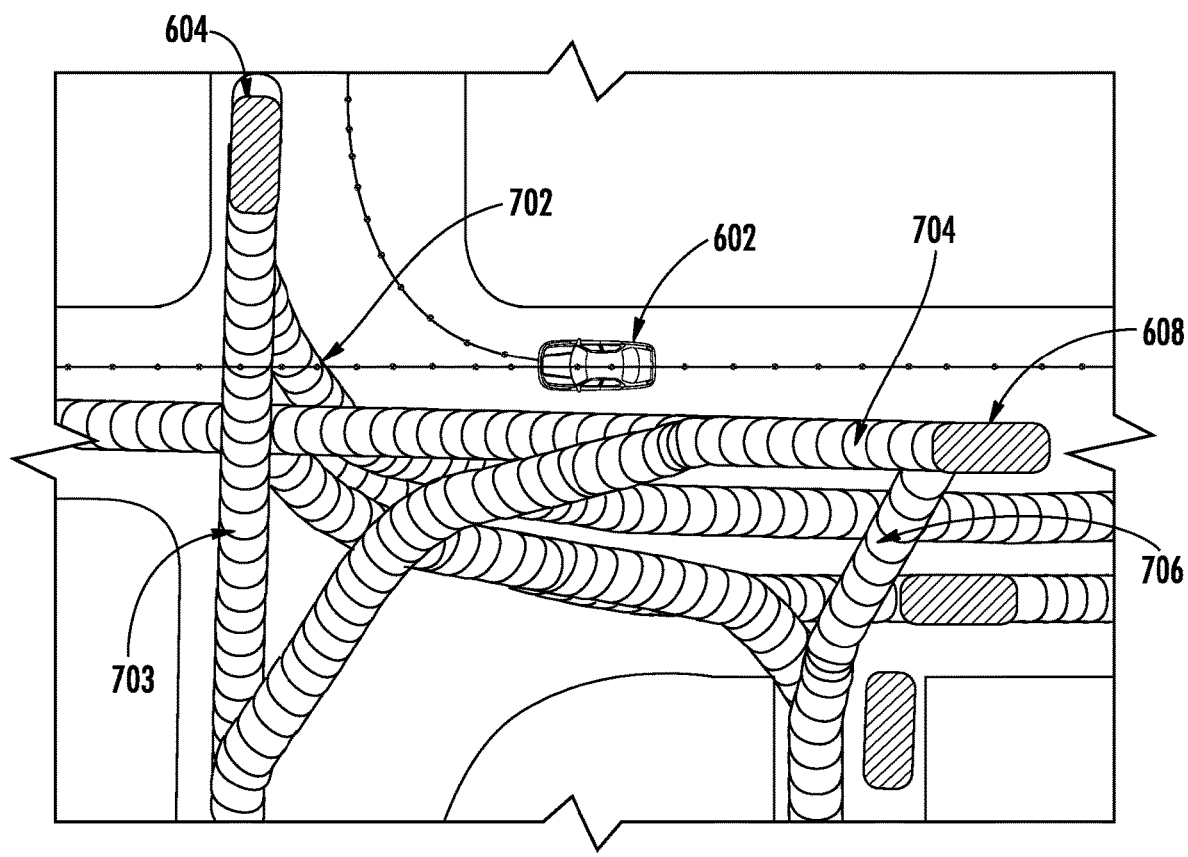

To provide another simplified example of the above-described aspects, FIGS. 6A and 6B depict graphical diagrams of an example goal-based prediction process according to example embodiments of the present disclosure. In particular, FIG. 6A depicts an autonomous vehicle 602 on a roadway. The autonomous vehicle 602 perceives additional objects 604 and 608. A prediction system of the autonomous vehicle 602 can identify one or more goals for each of the perceived objects 604 and 608. As examples, identifying the goal(s) for the object 604 can include identifying a number of different nominal pathways, including, as examples, nominal pathways 612 and 614. For example, nominal pathways 612 and 614 can be identified based on map data descriptive of lane information, for example as illustrated at 610.

Referring again to FIG. 3, the trajectory development model 312 can generate one or more predicted trajectories respectively for the one or more goals. In particular, the predicted trajectory for each goal (e.g., each goal included in the selected subset) can describe a trajectory by which the object achieves such goal (e.g., completes a left turn). Thus, the trajectory development model 312 can simulate the motion of the objects to achieve their assigned goal(s).

In some implementations, the trajectory development model 312 can be a learning-based predictor. In particular, in some implementations, the trajectory development model 312 can be trained using real-world log data that is descriptive of real-world trajectories taken by objects (e.g., humanly-operated vehicles). As such, the predictions provided by the trajectory development model 312 can more closely resemble (and therefore more accurately predict) the trajectories taken by the object(s).

The trajectory development model 312 can be or include many different forms of machine-learned models. For example, in some implementations, the trajectory development model 312 can be or include a decision tree-based model. For example, the trajectory development model 312 can be a random forest model such as, for example, a boosted regression forest. As another example, the trajectory development model 312 can be or include a neural network (e.g., a deep neural network). Example neural networks include feed-forward neural networks, recurrent neural networks, convolutional neural networks, etc.

In some implementations, each predicted trajectory provided by the trajectory development model 312 can include a sequence of future states (e.g., positions, velocities, etc.) for the object. Thus, the predicted trajectory can include a sequence of predicted future object state data over a number of time periods.

In some implementations, the trajectory development model 312 can provide each predicted trajectory in coordinates defined relative to a lane, lane path, and/or nominal pathway, where the corresponding goal includes continued travel of the object along the lane, lane path, and/or nominal pathway.

In one particular example of the above described concepts, in some implementations, the trajectory development model 312 can be or include a machine-learned random regression forest. The machine-learned random regression forest can include a plurality of decision trees that each output a plurality of sequences of future states for the object. In particular, each decision tree can output at one of its leaves the full trajectory predicted by such decision tree.

In addition, in some implementations, a weighted sum of the plurality of sequences respectively provided by the plurality of decision trees can be formed based on a plurality of weights respectively assigned to the plurality of decision trees. Such weighted sum can be used as the predicted trajectory provided by the trajectory development model 312 for the corresponding goal.

Thus, the trajectory development model 312 can provide a trajectory by which the object can achieve a particular goal. However, as indicated above, in instances in which no satisfactory goal was identified, a ballistics motion model 320 can be employed rather than or in addition to the trajectory development model 312.

To provide one simplified example of the above-described aspects, FIG. 5 depicts a graphical diagram of an example goal-based prediction process according to example embodiments of the present disclosure. In particular, as described above, one example goal that can be identified for the vehicle 504 is to traverse or complete the nominal pathway 508. The prediction system of the autonomous vehicle 502 (e.g., through use of the trajectory development model 312) can generate a predicted trajectory by which the vehicle 504 achieves such goal. In particular, FIG. 5 illustrates an example predicted trajectory 510 for achieving the goal of completing nominal pathway 508. As illustrated, the trajectory 510 does not necessarily correspond exactly to the nominal pathway 508 or travel exactly within the corresponding lane path 506a-c but instead includes a shorter turn that corresponds more closely to actual human behavior. Thus, in some implementations in which the trajectory development model 312 is trained using real-world observed trajectories, the predicted trajectories provided by the model 312 can more accurately reflect actual vehicle behavior (e.g., humanly-operated vehicle behavior), as opposed to nominal pathways that adhere strictly to lane or other roadway shapes. As another example, the predicted trajectory 510 may also differ from the nominal pathway 508 due to the position, heading, speed, etc. of the vehicle 504 deviating from averages or expected values associated with the nominal pathway 508.

To provide another simplified example of the above-described concepts, FIGS. 6A and 6B depict graphical diagrams of an example goal-based prediction process according to example embodiments of the present disclosure. In particular, referring to FIG. 6A, a prediction system of the autonomous vehicle 602 can obtain state data for each of the objects 604 and 608 (e.g., position, heading, velocity, acceleration, footprint, etc.). In addition, the prediction system can obtain or generate (e.g., based on map data) a number of features descriptive of various lanes, nominal paths, and/or relationships between the objects and lanes, paths, etc. For example, the relative location, speed, heading, etc. of object 604 to lane information 610 can be described by features.

As described above, goal(s) can be generated for each object 604 and 608. As examples, identifying the goal(s) for the object 604 can include identifying a number of different nominal pathways, including, as examples, nominal pathways 612 and 614. For example, nominal pathways 612 and 614 can be identified based on map data descriptive of lane information, for example as illustrated at 610.

Referring now to FIG. 6B, based on the state data, the feature data, and/or information descriptive of the goal(s) for each object, the prediction system of the autonomous vehicle 602 (e.g., through use of the trajectory development model 312) can generate a predicted trajectory by which each object achieves each goal selected for such object. As one example, a predicted trajectory 702 can be generated for the object 604 and the nominal pathway 614. As another example, a predicted trajectory 703 can be generated for object 604 and nominal pathway 612. As yet further examples, predicted trajectories 704 and 706 can be generated for the object 608. As illustrated in FIG. 6B, in some implementations, each predicted trajectory (e.g., trajectories 702 and 703) can be formed of or otherwise include a sequence of future states (e.g., positions, velocities, etc.) for the corresponding object. Each predicted future state can be associated with a respective future time.

Referring again to FIG. 3, in some implementations, the scenario development system 206 can further include a trajectory scoring model 314 that generates a score for each predicted trajectory provided by the trajectory development model 312. For example, the trajectory scoring model 314 can be a machine-learned model trained or otherwise configured to receive a trajectory and provide a score indicative of, for example, how realistic or achievable such trajectory is for the object. For example, the trajectory scoring model 314 can be trained on training data that includes trajectories labelled as a valid trajectory (e.g., an observed trajectory) or an invalid trajectory (e.g., a synthesized trajectory).

Similarly to the goal scoring process, the score generated by the trajectory scoring model 314 for each predicted trajectory can be compared to a threshold score. In some implementations, each trajectory that is found to be satisfactory (e.g., receives a score higher than the threshold score) can be used (e.g., passed on to the motion planning system), as shown at 318. Alternatively, a certain number of the highest scoring trajectories can be used at 318.

However, in some implementations, if none of the trajectories receive a score greater than the threshold score or are otherwise found to be satisfactory, then the ballistics motion model 320 can be employed rather than or in addition to use of the predicted trajectories provided by the trajectory development model 312. This decision or logic flow is illustrated at 316.

The ballistics motion model 320 can be used to provide a predicted trajectory for an object that is not static but for which the system was unable to determine a satisfactory goal (e.g., the object does not appear to be following standard goal-based behavior) and/or unable to determine a satisfactory predicted trajectory. In some instances, use of the ballistics motion model 320 can be viewed as trajectory prediction without an explicit goal. As such, the ballistics motion model 320 can assist in addressing some map issues, off-map actors, and/or unconventional behavior.

In some implementations, the ballistics motion model 320 can roll out the current state (e.g., position, heading, speed) of the object to provide a predicted trajectory. For example, in some implementations, the perception system described above can employ a Kalman filter to model object (e.g., vehicle) motion dynamics. As such, in some implementations, the ballistics motion model 320 can perform a forward integration of this Kalman filter model to generate the predicted trajectory based on the current and/or past state of the object.

In some implementations, the predicted trajectory provided by the ballistics motion model 320 can be used as the predicted trajectory for the object without further analysis.

However, in other implementations, the scenario development system 206 can further include a ballistic quality classifier 322. The ballistic quality classifier 322 can distinguish good from poor ballistics-based trajectories. In some implementations, the ballistic quality classifier 322 can simply provide a binary classification for the predicted trajectory provided by the ballistics motion model 320. In other implementations, the ballistic quality classifier 322 can provide a score (e.g., a regression score) for the predicted trajectory, and, in some implementations, the score can be compared to a threshold value to determine a binary classification for the predicted trajectory.

In some implementations, the score provided by the ballistic quality classifier 322 can impact a time period and/or probability assigned to or used in conjunction with the predicted trajectory. For example, a predicted trajectory that receives a lower score can be assigned a lower confidence value or probability and/or modified so that only a portion of the predicted trajectory associated with a shorter period of time is used or otherwise passed to the motion planning system.

In some implementations, the ballistic quality classifier 322 can be a machine-learned model, such as, for example, a decision-tree-based model and/or a neural network. For example, the ballistic quality classifier 322 can be a regression forest binary classifier. In some implementations, the ballistic quality classifier 322 can be a regression that outputs a number of seconds where the ballistic trajectory is satisfactory. In some implementations, the ballistic quality classifier 322 can be trained to have a high recall (e.g., to retrieve a large number of good ballistics, while allowing some bad ballistics in the system). In some implementations, the roll-out horizon of the predicted trajectory provided by the ballistics motion model 320 can itself be predicted or otherwise adjustable.

In some implementations, if the predicted trajectory provided by the ballistics motion model 320 is classified as satisfactory by the ballistic quality classifier 322, the predicted trajectory generated by the ballistic ballistics motion model 320 can be used for the object (e.g., provided to motion planning for the object), as illustrated at 326.

However, in some implementations, if the predicted trajectory provided by the ballistics motion model 320 is classified as unsatisfactory by the ballistic quality classifier 322, the corresponding object and/or goal can be treated as a default or fall-through case. This decision or logic is illustrated at 324. In some implementations, in the default or fall-through case, the prediction system 300 can simply assume the object will remain static, for example, as illustrated at 305. In other implementations, in the default or fall-through case, the motion plan can be modified or otherwise generated with an explicit objective to stay away from or otherwise avoid a general area in which the fall-through object is located.

In some implementations, a probability can be assigned to each predicted trajectory, whether generated by the trajectory development model 312 or the ballistics motion model 320. For example, the probability assigned to a given trajectory can be based at least in part on the score provided for the corresponding goal by the goal scoring model 308 and/or the ballistic quality classifier 322. The probability assigned to each trajectory can be taken into account when performing motion planning.

Thus, the prediction system 300 can include or leverage a number of machine-learned models that assist in predicting the future locations of the objects. The use of machine-learned models can improve the speed, quality, and/or accuracy of the generated predictions.

Figure 7:
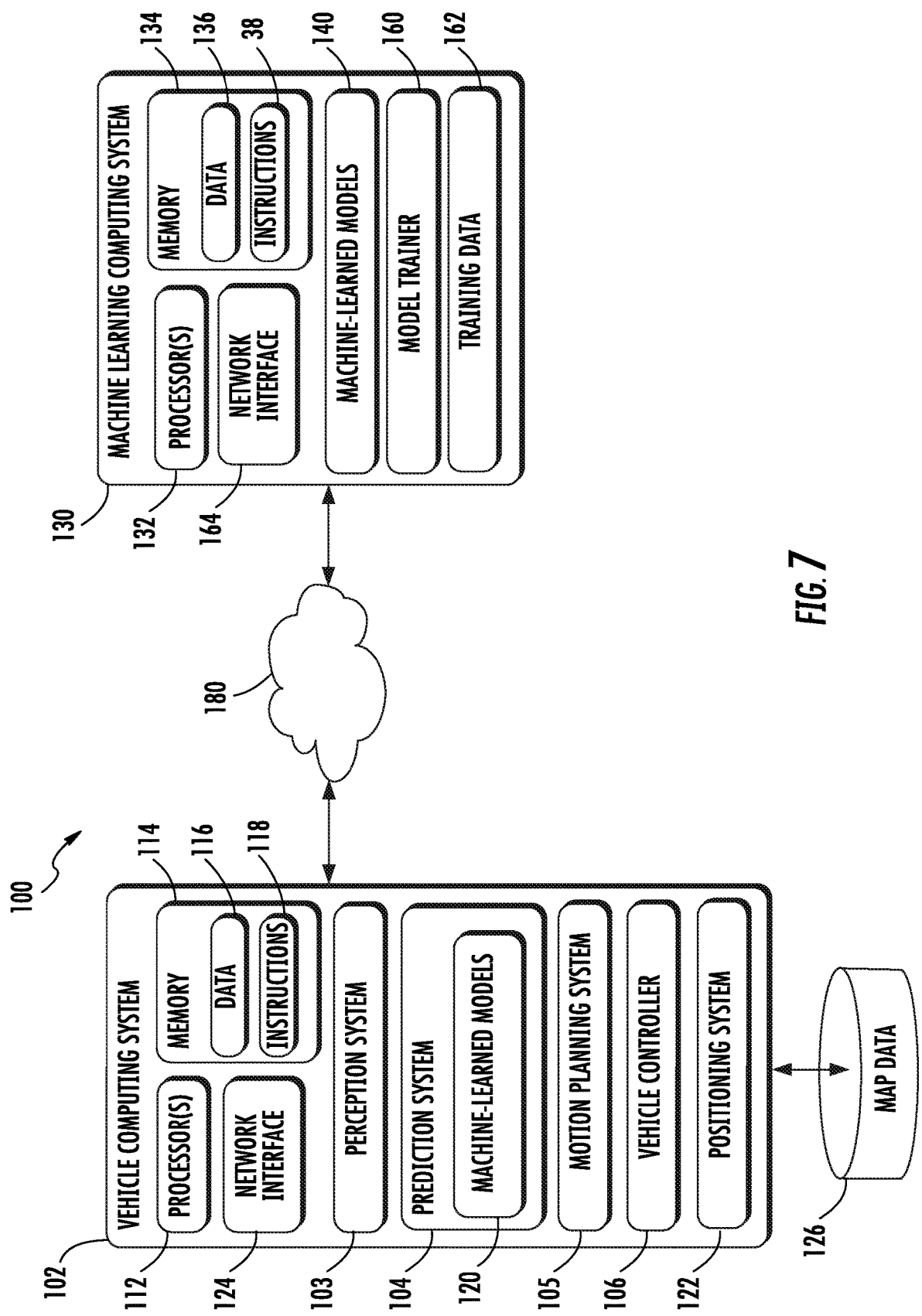
FIG. 7 depicts a block diagram of an example computing system according to example embodiments of the present disclosure.

FIG. 7 depicts a block diagram of an example computing system 100 according to example embodiments of the present disclosure. The example system 100 includes a vehicle computing system 102 and a machine learning computing system 130 that are communicatively coupled over a network 180.

The vehicle computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

According to an aspect of the present disclosure, the computing system 102 can store or include one or more machine-learned models 120. For example, the models 120 can be or can otherwise include various machine-learned models such as decision-tree based models (e.g., random forests), support vector machines, neural networks (e.g., deep neural networks), or other multi-layer non-linear models. Example neural networks include feed-forward neural networks, recurrent neural networks (e.g., long short-term memory recurrent neural networks), or other forms of neural networks.

In some implementations, the computing system 102 can receive the one or more machine-learned models 120 from the machine learning computing system 130 over network 180 and can store the one or more machine-learned models 120 in the memory 114. The computing system 102 can then use or otherwise implement the one or more machine-learned models 120 (e.g., by processor(s) 112).

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 120 at the computing system 102, the machine learning computing system 130 can include one or more machine-learned models 140. For example, the models 140 can be or can otherwise include various machine-learned models such as decision-tree based models (e.g., random forests), support vector machines, neural networks (e.g., deep neural networks), or other multi-layer non-linear models. Example neural networks include feed-forward neural networks, recurrent neural networks (e.g., long short-term memory recurrent neural networks), or other forms of neural networks.

As an example, the machine learning computing system 130 can communicate with the computing system 102 according to a client-server relationship. For example, the machine learning computing system 140 can implement the machine-learned models 140 to provide a web service to the computing system 102. For example, the web service can provide an object trajectory prediction service.

Thus, machine-learned models 120 can be located and used at the computing system 102 and/or machine-learned models 140 can be located and used at the machine learning computing system 130.

In some implementations, the machine learning computing system 130 and/or the computing system 102 can train the machine-learned models 120 and/or 140 through use of a model trainer 160. The model trainer 160 can train the machine-learned models 120 and/or 140 using one or more training or learning algorithms. One example training technique is backwards propagation of errors. In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train a machine-learned model 120 and/or 140 based on a set of training data 162. The training data 162 can include, for example, the vehicle data logs with labels and/or other forms of vehicle data. The model trainer 160 can be implemented in hardware, firmware, and/or software controlling one or more processors.

In some implementations, vehicle computing system 102 can further include a positioning system 122. Positioning system 122 can determine a current geographic location of the autonomous vehicle. The positioning system 122 can be any device or circuitry for analyzing the position of the autonomous vehicle 10. For example, the positioning system 122 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the vehicle can be used by various systems of the vehicle computing system 102.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 7 illustrates one example computing system 100 that can be used to implement the present disclosure. Other computing systems can be used as well. For example, in some implementations, the computing system 102 can include the model trainer 160 and the training dataset 162. In such implementations, the machine-learned models 120 can be both trained and used locally at the computing system 102. As another example, in some implementations, the computing system 102 is not connected to other computing systems.

In addition, components illustrated and/or discussed as being included in one of the computing systems 102 or 130 can instead be included in another of the computing systems 102 or 130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Example Methods

Figure 8:
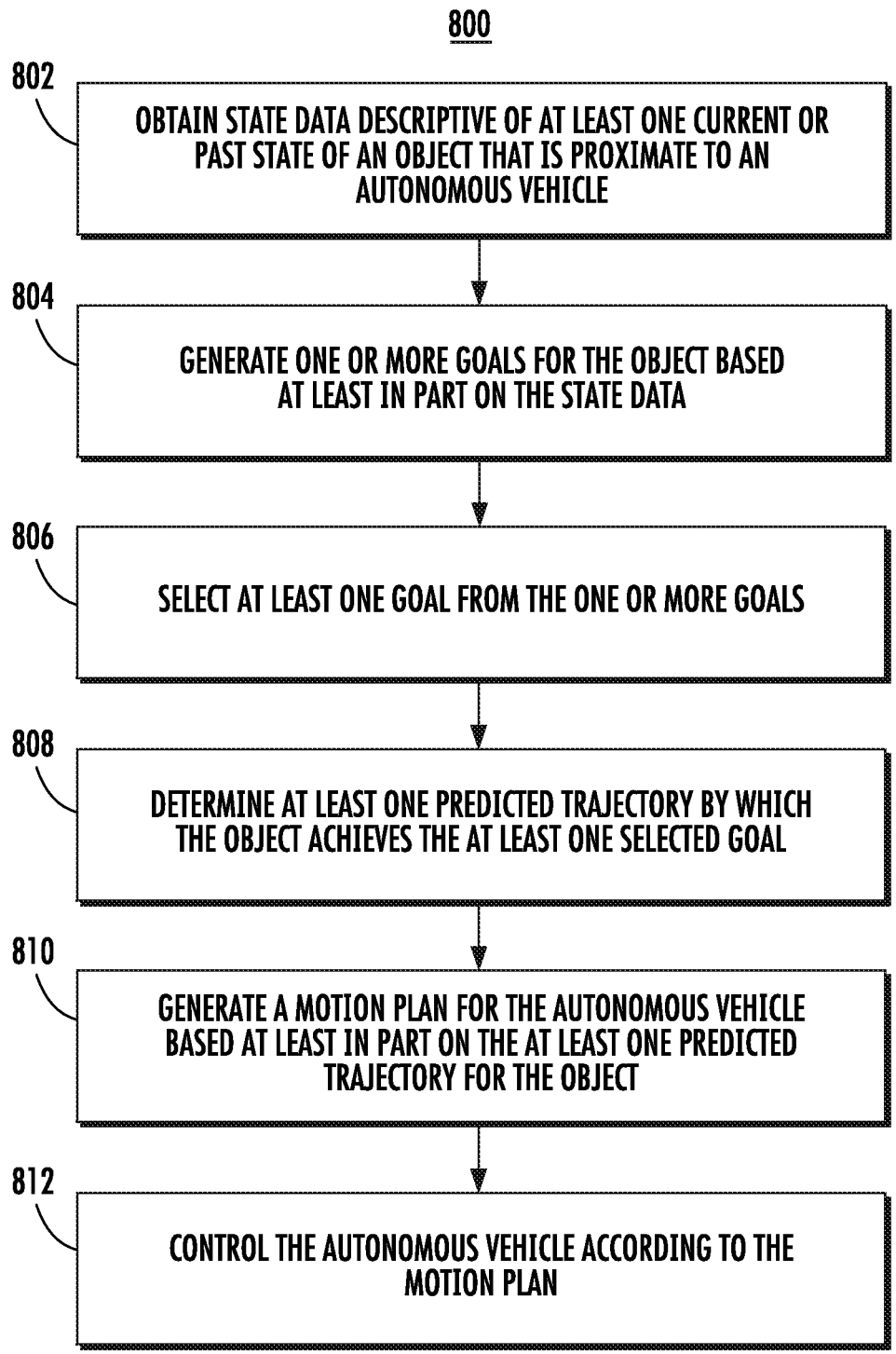
FIG. 8 depicts flow chart diagram of an example method to control an autonomous vehicle according to example embodiments of the present disclosure.

FIG. 8 depicts flow chart diagram of an example method 800 to control an autonomous vehicle according to example embodiments of the present disclosure.

At 802, a computing system obtains state data descriptive of at least one current or past state of an object that is perceived by an autonomous vehicle. As an example, in some implementations, a perception system can provide, for each object that is proximate to and/or perceived by the autonomous vehicle, state data that describes a current state of such object. As examples, the state data for each object can describe an estimate of the object's: current location (also referred to as position); current speed (also referred to as velocity); current acceleration, current heading; current orientation; current yaw rate; size/footprint (e.g., as represented by a bounding polygon); class (e.g., vehicle vs. pedestrian vs. bicycle), and/or other state information.

At 804, the computing system generates one or more goals for the object based at least in part on the state data. For example, any number of different goal generators can be used to generate the one or more goals.

In some implementations, at 804, the computing system can identify at least one nominal pathway for the object. For example, the computing system can identify one or more nominal pathways for the object based on the current state of the object as indicated by the data obtained at 802. As an example, any nominal pathway within a certain distance of the current location of the object can be identified for the object at 802. As another example, up to a maximum number of nominal pathways can be identified for the object based on the current location and heading of the object. As yet another example, the computing system can identify one or more current lanes that the object occupies and can retrieve any nominal pathways that traverse or are otherwise associated with such current lane(s). In some implementations, at 804, the computing system can identify nominal pathways that are associated with the particular object class of the object. For example, if the object is in the pedestrian class, then pedestrian nominal pathways can be identified for the object.

In some implementations, one or more goal generators can identify a significant number of potential sets of lane paths along which the object may have a goal of traveling. For example, lanes can be identified based on a current position and/or heading of the object in addition to various other types of information and/or features (e.g., all lanes within a threshold distance from the object can be identified as potential goals or combined to generate potential goals).

In some implementations, generating the one or more goals for the object at 804 can include inputting at least the state data descriptive of the at least one current or past state of the object into a machine-learned static object classifier and receiving a classification of the object as either static or not static as an output of the machine-learned static object classifier. For example, a static object can have a goal of remaining stationary.

At 806, the computing system selects at least one goal from the one or more goals.

In some implementations, the goal selected for the object can be a remaining stationary goal when a machine-learned static object classifier classifies the object as static.

In some implementations, selecting the at least one goal at 806 can include inputting at least the state data descriptive of the at least one current or past state of the object and/or data descriptive of the generated goal(s) into a machine-learned goal scoring model and receiving one or more scores for the object respectively relative to the one or more goals as an output of the machine-learned goal scoring model.

As an example, in some implementations, the machine-learned goal scoring model can be a machine-learned binary classifier model that has been trained to score the object relative to each of one or more nominal pathways.

In some implementations, the computing system implements the machine-learned goal scoring model to generate the score for each of the one or more goals when a machine-learned static object classifier classifies the object as not static.

Selecting the at least one goal at 806 can further include selecting at least goal from the one or more goals based at least in part on the one or more scores. For example, all goals that received a score higher than a threshold value can be included in the selected subset. As another example, the goals can be ranked on the basis of their scores, and a predetermined number of the highest ranked goals can be selected.

At 808, the computing system determines at least one predicted trajectory by which the object achieves the at least one selected goal.

In some implementations, determining the at least one predicted trajectory by which the object achieves the first goal can include inputting at least the state data descriptive of the at least one current or past state of the object and/or data descriptive of the first goal into a machine-learned trajectory development model and receiving at least the first predicted trajectory as an output of the machine-learned trajectory development model.

In some implementations, the at least one selected goal can include continued travel of the object along a nominal pathway and the machine-learned trajectory development model can provide the at least one predicted trajectory in coordinates defined relative to the nominal pathway.

In some implementations, the machine-learned trajectory development model can be or include a machine-learned regression forest model that includes a plurality of decision trees that each output a plurality of sequences of future states of the object. As an example, the at least one predicted trajectory can be a weighted sum of the plurality of sequences of future states of the object.

In some implementations, determining the at least one predicted trajectory by which the object achieves the first goal can include inputting at least the state data descriptive of the at least one current or past state of the object into a ballistics motion model and receiving at least the first predicted trajectory as an output of the ballistics motion model.

In some implementations, the computing system employs the ballistics motion model at 808 when at least one of the following occurs: the scenario generation system fails to generate one or more satisfactory goals for the object; and the machine-learned trajectory development model fails to generate one or more satisfactory predicted trajectories for the object. For example, goals and/or trajectories can be compared to respective threshold values/scores to determine whether they are satisfactory.

In some implementations, determining the at least one predicted trajectory by which the object achieves the first goal can further include providing the trajectory output by the ballistics motion model to a ballistic quality classifier that is configured to classify the at least one predicted trajectory determined by the ballistics motion model as satisfactory or unsatisfactory. Determining the at least one predicted trajectory can include receiving a classification of the predicted trajectory provided by the ballistics motion model as satisfactory or not satisfactory as an output of the machine-learned ballistic quality classifier. When the machine-learned ballistic quality classifier classifies the first predicted trajectory provided by the ballistics motion model as not satisfactory, a default trajectory in which the object remains static can be selected.

At 810, the computing system generates a motion plan for the autonomous vehicle based at least in part on the at least one predicted trajectory for the object. In particular, given predictions about the future locations of proximate objects, the computing system can determine a motion plan for the autonomous vehicle that best navigates the vehicle relative to the objects at their future locations.

As one example, at 810, the computing system can determine a cost function for each of one or more candidate motion plans for the autonomous vehicle based at least in part on the predicted future locations of the objects. For example, the cost function can describe a cost (e.g., over time) of adhering to a particular candidate motion plan. For example, the cost described by a cost function can increase when the autonomous vehicle strikes another object and/or deviates from a preferred pathway (e.g., a nominal pathway) (e.g., runs off of the road).

Thus, given information about the predicted future locations of objects, at 810, the computing system can determine a cost of adhering to a particular candidate pathway. The computing system can select or determine a motion plan for the autonomous vehicle based at least in part on the cost function(s). For example, the motion plan that minimizes the cost function can be selected or otherwise determined.

At 812, the computing system controls the autonomous vehicle to execute the motion plan. For example, a vehicle controller can control one or more vehicle controls (e.g., actuators that control gas flow, steering, braking, etc.) to execute the selected motion plan.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 8 depicts steps performed in a particular order for purposes of illustration and discussion, the methods of the present disclosure are not limited to the particularly illustrated order or arrangement. The various steps of method 800 can be omitted, rearranged, combined, and/or adapted in various ways without deviating from the scope of the present disclosure.

What is claimed is:

1. A computer system, comprising:
   one or more processors;
   a scenario generation system implemented by the one or more processors, wherein the scenario generation system is configured to:
      receive state data descriptive of at least a current or past state of an object that is perceived by an autonomous vehicle; and
      generate one or more goals for the object based at least in part on the state data, wherein each of the one or more goals corresponds to a set of one or more decisions that result in the object achieving a goal location;
      wherein the scenario generation system comprises a machine-learned goal scoring model configured to generate a score for each of the one or more goals generated for the object; and
      wherein the score generated by the machine-learned goal scoring model for each goal is indicative of a predicted likelihood that the object will pursue the set of one or more decisions associated with such goal to achieve the goal location associated with such goal; and
   a scenario development system implemented by the one or more processors,
   wherein at least one of the scenario generation system and the scenario development system is further configured to select at least one of the one or more goals based at least in part on the scores generated for the one or more goals by the machine-learned goal scoring model;
   wherein the scenario development system is configured to:
      receive data indicative of the at least one of the one or more goals selected by the at least one of the scenario generation system and the scenario development system; and
      determine at least one predicted trajectory by which the object achieves the at least one goal location associated with the at least one of the one or more goals selected by the at least one of the scenario generation system and the scenario development system; and
      wherein the scenario development system comprises a machine-learned trajectory scoring model configured to provide at least one score for the at least one predicted trajectory by which the object achieves the at least one goal location associated with the at least one of the one or more goals, wherein a score provided by the machine-learned trajectory scoring model for a particular predicted trajectory is indicative of a predicted likelihood that the object would move along the particular trajectory if attempted by the object, and wherein the machine-learned trajectory scoring model has been trained on training data that comprises a first set of training trajectories labelled as valid trajectories and a second set of training trajectories labelled as invalid trajectories.

2. The computer system of claim 1, further comprising:
   a motion planning system implemented by the one or more processors, wherein the motion planning system is configured to generate a motion plan for the autonomous vehicle based at least in part on the at least one predicted trajectory determined for the object by the scenario development system.

3. The computer system of claim 1, wherein the scenario generation system comprises a machine-learned static object classifier configured to classify the object as either static or not static.

4. The computer system of claim 3, wherein the machine-learned static object classifier comprises a machine-learned random forest model.

5. The computer system of claim 1, wherein the goal location for each goal comprises one or more nominal pathways that correspond to common paths of travel, and wherein the machine-learned goal scoring model comprises a machine-learned binary classifier model that has been trained to score the object relative to the one or more nominal pathways respectively associated with each goal.

6. The computer system of claim 1, wherein:
the scenario generation system comprises a machine-learned static object classifier configured to classify the object as either static or not static; and
the one or more processors implement the machine-learned goal scoring model to generate the score for each of the one or more goals when the machine-learned static object classifier classifies the object as not static.

7. The computer system of claim 1, wherein the machine-learned goal scoring model comprises a machine-learned random forest model.

8. The computer system of claim 1, wherein the scenario development system comprises a machine-learned trajectory development model configured to determine the at least one predicted trajectory by which the object achieves the at least one of the one or more goals.

9. The computer system of claim 8, wherein:
the at least one of the one or more goals comprises continued travel of the object along a nominal pathway; and
the machine-learned trajectory development model provides the at least one predicted trajectory in coordinates defined relative to the nominal pathway.

10. The computer system of claim 8, wherein the machine-learned trajectory development model comprises a machine-learned regression forest model or a deep neural network.

11. The computer system of claim 10, wherein:
the machine-learned regression forest model comprises a plurality of decision trees that each output a plurality of sequences of future states of the object; and
the at least one predicted trajectory comprises a weighted sum of the plurality of sequences of future states of the object.

12. The computer system of claim 8, wherein the scenario development system further comprises:
a ballistics motion model configured to determine the at least one predicted trajectory for the object when at least one of:
the scenario generation system fails to generate one or more goals for the object that receive a first score from the machine-learned goal scoring model greater than a first threshold score; and
the machine-learned trajectory development model fails to generate one or more predicted trajectories for the object that receive a second score from the machine-learned trajectory scoring model greater than a second threshold score; and
a ballistic quality classifier configured to classify the at least one predicted trajectory determined by the ballistics motion model as satisfactory or unsatisfactory.

13. The computer system of claim 1, wherein the at least one predicted trajectory comprises a sequence of future states for the object.

14. The computer system of claim 1, wherein to generate the one or more goals for the object the scenario generation system is configured to generate a plurality of lane sequences by rolling out a current lane of the object respectively into a plurality of successor lanes.

15. An autonomous vehicle, comprising:
one or more processors; and
one or more non-transitory computer-readable media that collectively store instructions that, when executed by the one or more processors, cause the one or more processors to perform operations, the operations comprising:
obtaining state data descriptive of at least one current or past state of an object that is perceived by the autonomous vehicle;
generating one or more goals for the object based at least in part on the state data, wherein each of the one or more goals corresponds to a set of one or more decisions that result in the object achieving a goal location;
selecting at least a first goal of the one or more goals generated for the object, wherein selecting at least the first goal of the one or more of the goals generated for the object comprises:
inputting at least the state data descriptive of the at least one current or past state of the object and data descriptive of the one or more goals generated for the object into a machine-learned goal scoring model implemented by the one or more processors;
receiving one or more scores for the object respectively relative to the one or more goals as an output of the machine-learned goal scoring model, wherein the score output by the machine-learned goal scoring model for each goal is indicative of a predicted likelihood that the object will pursue the set of one or more decisions associated with such goal to achieve the goal location associated with such goal; and
selecting at least the first goal from the one or more goals based at least in part on the one or more scores;
determining at least a first predicted trajectory by which the object achieves a first goal location associated with the first goal;
inputting at least the first predicted trajectory into a machine-learned trajectory scoring model configured to provide at least a first score for at least the first predicted trajectory, wherein the trajectory scoring model has been trained on training data that comprises a first set of training trajectories labelled as valid trajectories and a second set of training trajectories labelled as invalid trajectories; and
receiving the least the first score for at least the first predicted trajectory as an output of the machine-learned trajectory scoring model, wherein the first score is indicative of a predicted likelihood that the object would move along the first predicted trajectory if attempted by the object.

16. The autonomous vehicle of claim 15, wherein generating the one or more goals for the object comprises:
inputting at least the state data descriptive of the at least one current or past state of the object into a machine-learned static object classifier; and
receiving a classification of the object as either static or not static as an output of the machine-learned static object classifier;

wherein the first goal selected for the object comprises a remaining stationary goal when the machine-learned static object classifier classifies the object as static.

17. The autonomous vehicle of claim 15, wherein determining at least the first predicted trajectory by which the object achieves the first goal comprises:
   inputting at least the state data descriptive of the at least one current or past state of the object and data descriptive of at least the first goal into a machine-learned trajectory development model; and
   receiving at least the first predicted trajectory as an output of the machine-learned trajectory development model.

18. The autonomous vehicle of claim 15, wherein determining at least the first predicted trajectory by which the object achieves the first goal comprises:
   inputting at least the state data descriptive of the at least one current or past state of the object into a ballistics motion model; and
   receiving at least the first predicted trajectory as an output of the ballistics motion model.

19. A computer-implemented method, comprising:
   obtaining, by a computing system comprising one or more computing devices, state data descriptive of at least one current or past state of an object that is perceived by an autonomous vehicle;
   generating, by the computing system, one or more goals for the object based at least in part on the state data, wherein each of the one or more goals corresponds to a set of one or more decisions that result in the object achieving a goal location;
   selecting, by the computing system, at least a first goal of the one or more goals generated for the object, wherein selecting, by the computing system, at least the first goal of the one or more of the goals generated for the object comprises:
      inputting, by the computing system, at least the state data descriptive of the at least one current or past state of the object and data descriptive of the one or more goals generated for the object into a machine-learned goal scoring model implemented by the one or more processors;
      receiving, by the computing system, one or more scores for the object respectively relative to the one or more goals as an output of the machine-learned goal scoring model, wherein the score generated by the machine-learned goal scoring model for each goal is indicative of a predicted likelihood that the object will pursue the set of one or more decisions associated with such goal to achieve the goal location associated with such goal; and
      selecting, by the computing system, at least the first goal from the one or more goals based at least in part on the one or more scores;
   determining, by the computing system, at least a first predicted trajectory by which the object achieves the first goal;
   inputting at least the first predicted trajectory into a machine-learned trajectory scoring model configured to provide at least a first score for at least the first predicted trajectory, wherein the trajectory scoring model has been trained on training data that comprises a first set of training trajectories labelled as valid trajectories and a second set of training trajectories labelled as invalid trajectories; and
   receiving the least the first score for at least the first predicted trajectory as an output of the machine-learned trajectory scoring model, wherein the first score is indicative of a predicted likelihood that the object would move along the first predicted trajectory if attempted by the object.

\* \* \* \* \*